United States Patent [19]
Hanyu et al.

[11] Patent Number: 5,764,327
[45] Date of Patent: Jun. 9, 1998

[54] FERROELECTRIC LIQUID CRYSTAL DEVICE WITH UNEVEN SURFACE UNDER ALIGNMENT FILM AND PROCESS FOR PRODUCTION

[75] Inventors: Yukio Hanyu, Atsugi; Kenji Onuma, Isehara; Yoshio Hotta, Atsugi; Osamu Taniguchi, Chigaski; Hideaki Takao, Sagamihara; Masanobu Asaoka, Yokohama; Tadashi Mihara, Isehara; Yasuto Kodera, Fujisawa; Makoto Kojima, Hino; Katsutoshi Nakamura; Takatsugu Wada, both of Atsugi, all of Japan

[73] Assignee: Canon Kabushiki Kaisha, Tokyo, Japan

[21] Appl. No.: 742,940

[22] Filed: Oct. 31, 1996

Related U.S. Application Data

[62] Division of Ser. No. 314,421, Sep. 28, 1994, which is a division of Ser. No. 988,830, Dec. 10, 1992, Pat. No. 5,381,256.

[30] Foreign Application Priority Data

| Dec. 10, 1991 | [JP] | Japan | 3-349775 |
| Dec. 13, 1991 | [JP] | Japan | 3-351280 |
| Jan. 6, 1992 | [JP] | Japan | 4-018150 |
| Jan. 8, 1992 | [JP] | Japan | 4-018430 |
| Jan. 23, 1992 | [JP] | Japan | 4-031358 |
| Jan. 24, 1992 | [JP] | Japan | 4-032860 |
| Jan. 29, 1992 | [JP] | Japan | 4-036901 |
| Jan. 31, 1992 | [JP] | Japan | 4-040606 |

[51] Int. Cl.$^6$ .......... G02F 1/141; G02F 1/1337; G02F 1/1333
[52] U.S. Cl. .......... 349/133; 349/123; 349/138
[58] Field of Search .......... 349/123, 133, 349/138

[56] References Cited

U.S. PATENT DOCUMENTS

| 4,367,924 | 1/1983 | Clark et al. | 350/334 |
| 4,491,391 | 1/1985 | Nickol et al. | 359/79 |
| 4,561,726 | 12/1985 | Goodby et al. | 350/341 |
| 4,589,996 | 5/1986 | Inoue et al. | 252/299.65 |

(List continued on next page.)

FOREIGN PATENT DOCUMENTS

| 0444705 | 9/1991 | European Pat. Off. |
| 0494626 | 7/1992 | European Pat. Off. |
| 62-161123 | 7/1987 | Japan. |

OTHER PUBLICATIONS

Clark et al., "Submicrosecond bistable Electro–Optic Switching in Liquid Crystals", Applied Physics Letters, vol. 36, No. 11 (1980) 899:901.

Meyer et al., "Ferroelectric Liquid Crystals", Journal de Physique Letters, vol. 36, No. 3 (1975) L–69:71.

Solid State Physics, vol. 16, No. 3 (1981) 140:151.

J. M. Geary, "A Multiplexed Ferroelectric LCD Using AC Field–Stabilized States", SID Digest of Technical Papers (1985) 128:30.

Patent Abstracts of Japan, vol. 15, No. 166 Apr. 25, 1991 (P–1195) for JP 3–33722.

(List continued on next page.)

*Primary Examiner*—Anita Pellman Gross
*Attorney, Agent, or Firm*—Fitzpatrick, Cella, Harper & Scinto

[57] ABSTRACT

A ferroelectric liquid crystal device of a cell structure having a suppressed increase of cell thickness along a cell side is constituted by disposing a ferroelectric liquid crystal between a pair of electrode plates each sequentially provided with an electrode, an insulating film and an alignment film on a substrate. The alignment film is provided with a surface unevenness for suppressing a liquid crystal movement causing the increase in cell thickness. The surface unevenness is provided to the alignment film directly or to the insulating film below the alignment film, e.g., by wet forming the relevant film by using at least two solvents having different boiling points or dispersing fine particles within the relevant film, optionally followed by removal of the fine particles.

11 Claims, 22 Drawing Sheets

U.S. PATENT DOCUMENTS

| | | | |
|---|---|---|---|
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 350/350 S |
| 4,614,609 | 9/1986 | Inoue et al. | 252/299.66 |
| 4,622,165 | 11/1986 | Kano et al. | 252/299.65 |
| 4,802,740 | 2/1989 | Hotta et al. | 350/341 |
| 4,802,743 | 2/1989 | Takao et al. | 350/339 F |
| 4,836,655 | 6/1989 | Yamazaki | 349/138 |
| 4,861,143 | 8/1989 | Yamazaki et al. | 349/138 |
| 4,883,344 | 11/1989 | Okada et al. | 350/339 R |
| 4,941,736 | 7/1990 | Taniguchi et al. | 350/350 S |
| 5,013,137 | 5/1991 | Tsuboyama et al. | 350/333 |
| 5,076,671 | 12/1991 | Uchimi et al. | 349/133 |
| 5,129,727 | 7/1992 | Hanyu et al. | 359/75 |
| 5,165,076 | 11/1992 | Tsuboyama et al. | 359/75 |
| 5,192,596 | 3/1993 | Hanyu et al. | 428/1 |
| 5,204,766 | 4/1993 | Taniguchi et al. | 359/81 |
| 5,220,446 | 6/1993 | Rho | 359/79 |
| 5,250,330 | 10/1993 | Asaoka et al. | 428/1 |
| 5,253,090 | 10/1993 | Yamazaki et al. | 359/81 |
| 5,270,844 | 12/1993 | Maruyama et al. | 349/138 |
| 5,326,600 | 7/1994 | Asaoka et al. | 428/1 |
| 5,330,803 | 7/1994 | Takao et al. | 428/1 |
| 5,381,256 | 1/1995 | Hanyu et al. | 359/75 |
| 5,453,861 | 9/1995 | Shinjo et al. | 349/133 |
| 5,594,569 | 1/1997 | Konuma et al. | 349/122 |

OTHER PUBLICATIONS

Patent Abstracts of Japan, vol. 12, No. 180 (May 27, 1988) (P-709) for JP 62-291620.

Jakli et al., Ferroelectrics, vol. 69, No. 3/4 (1986) 153:63, "Electromechanical Effect in $S^*_c$ Liquid Crystals".

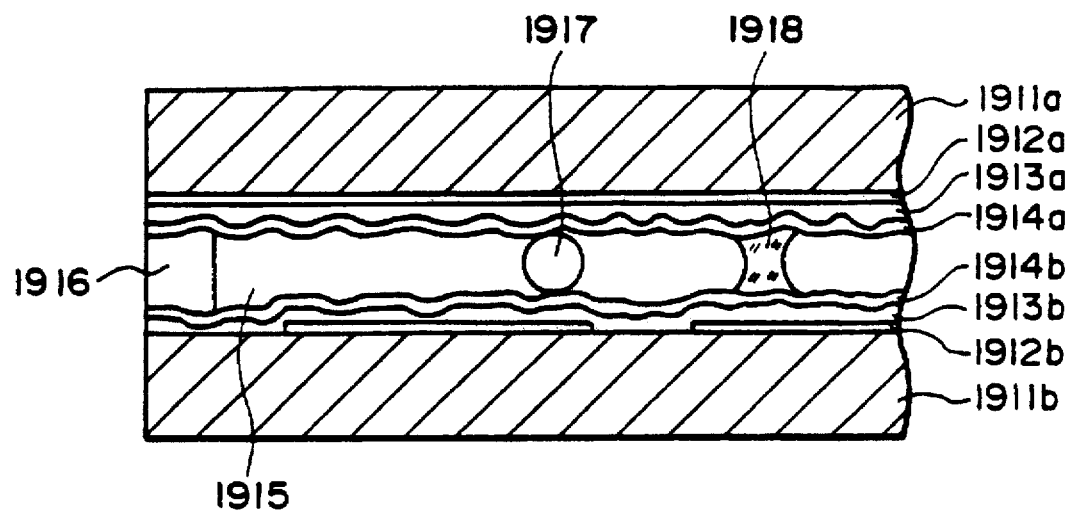
F I G. 19
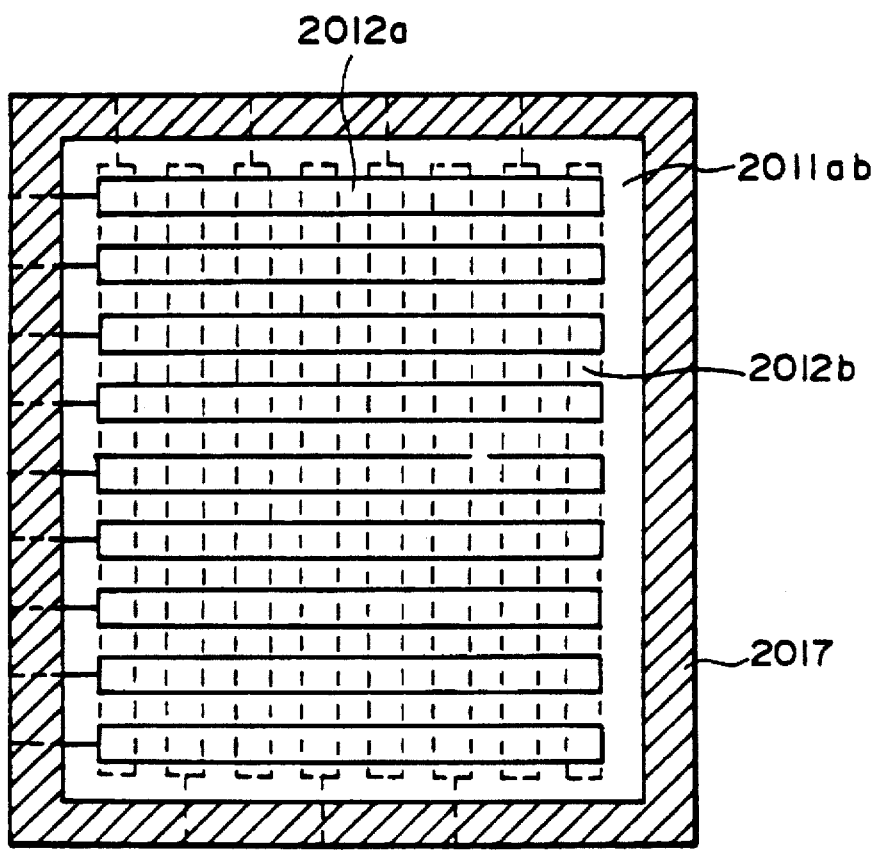
F I G. 20

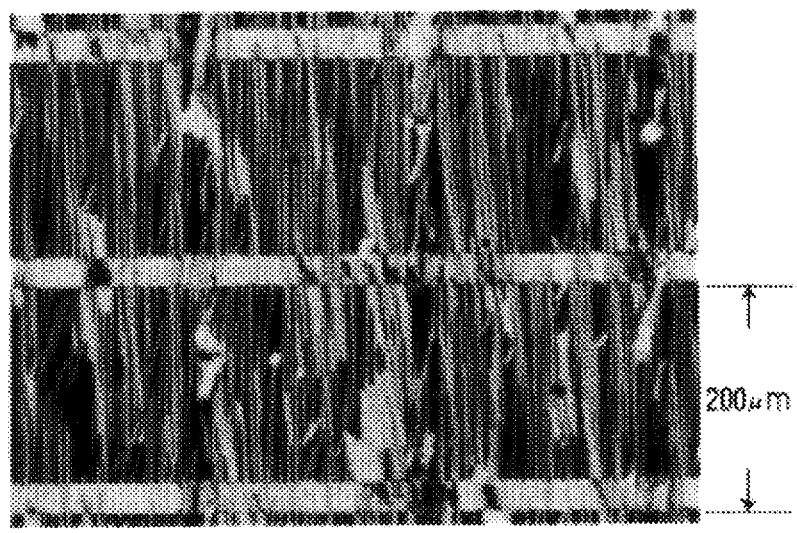
F I G. 23
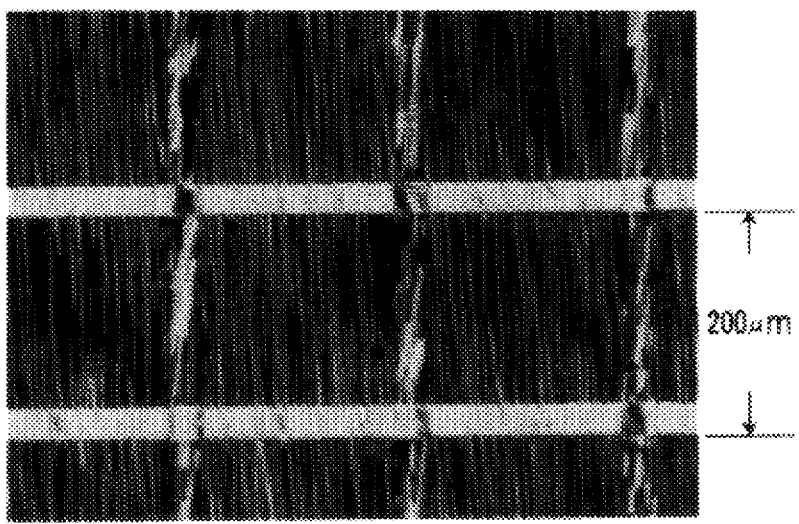
F I G. 24

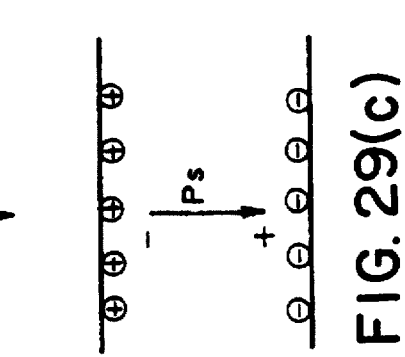
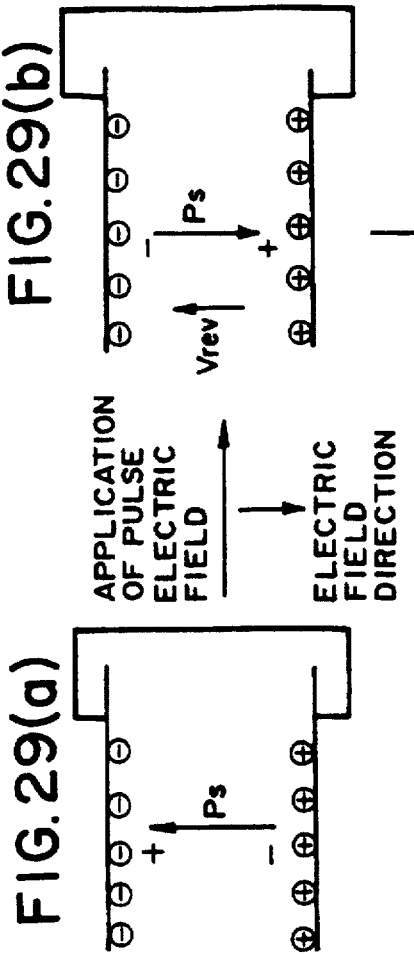
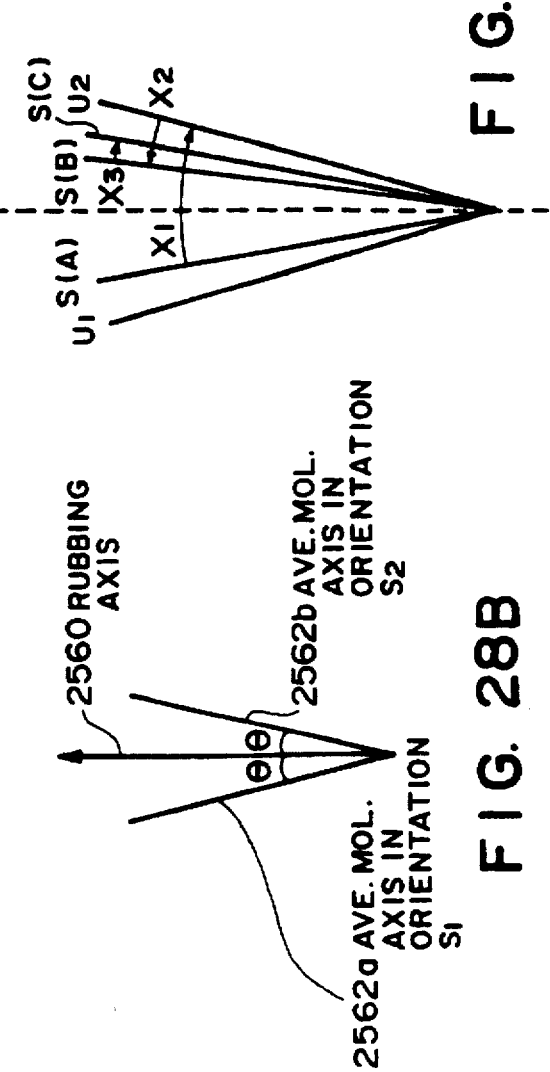

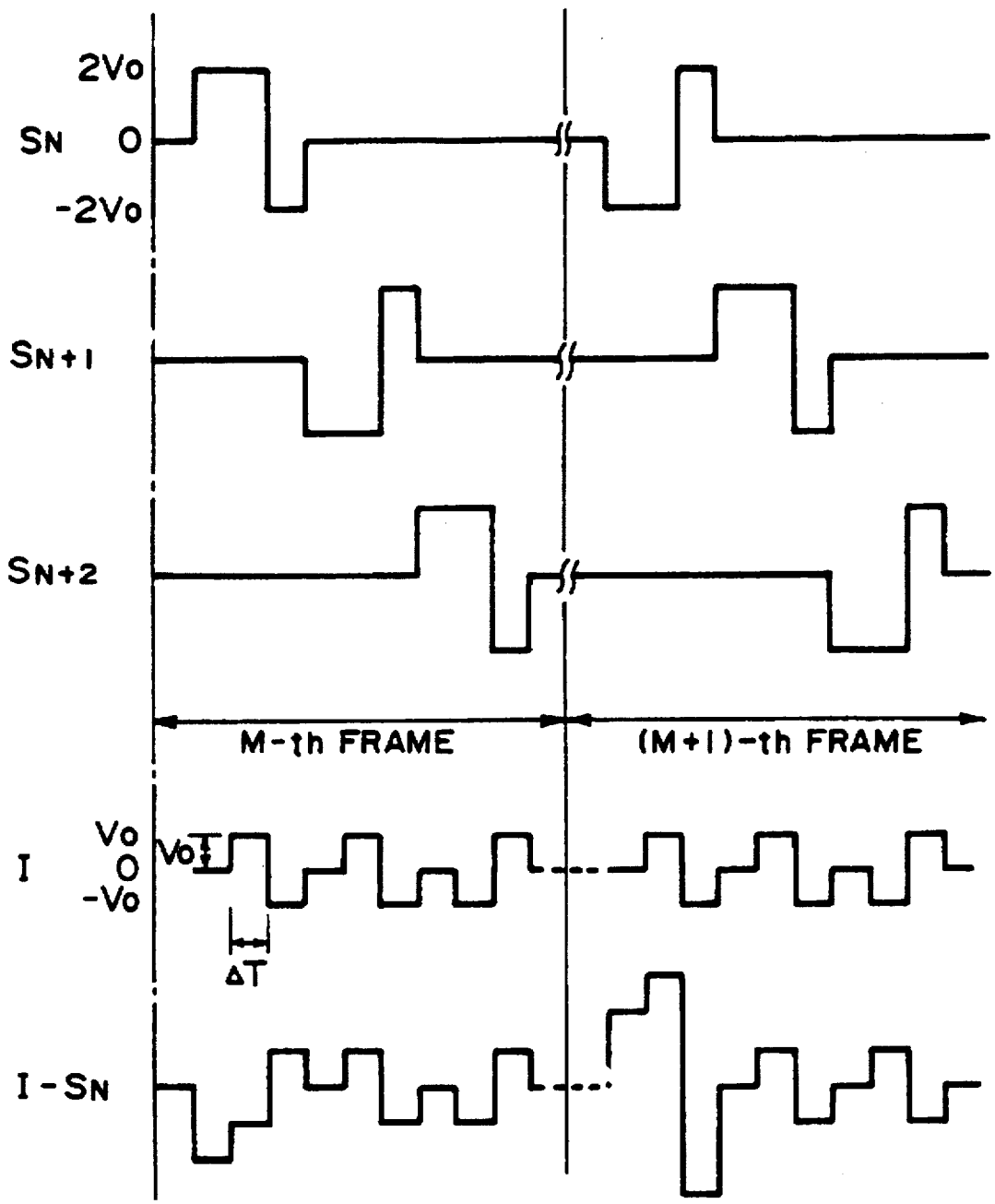
F I G. 33

FERROELECTRIC LIQUID CRYSTAL DEVICE WITH UNEVEN SURFACE UNDER ALIGNMENT FILM AND PROCESS FOR PRODUCTION

This application is a division of application Ser. No. 08/314,421, filed Sep. 28, 1994, which is a division of application Ser. No. 07/988,830, filed Dec. 10, 1992, now U.S. Pat. No. 5,381,256.

FIELD OF THE INVENTION AND RELATED ART

The present invention relates to a ferroelectric liquid crystal device and a process for production thereof, more particularly to a ferroelectric liquid crystal device having a cell structure with improved driving characteristics and a process for production thereof.

A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) of H phase (SmH*) of a non-helical structure and, under this state, shows a property of taking either one of a first optically stable state and a second optically stable state responding to an electrical field applied thereto and maintaining such a state in the absence of an electrical field, namely bistability, and also has a rapid response to the change in electrical field. Thus, it is expected to be utilized in a high speed and memory type display device and particularly to provide a large-area, high-resolution display.

For an optical modulating device by use of a liquid crystal having such bistability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta \sin^2 (\Delta nd/\lambda)\pi,$$

wherein $I_0$: incident light intensity,

I: transmitted light intensity,

θ: tilt angle,

Δn: refractive index anisotropy, d: thickness of the liquid crystal layer,

λ: wavelength of the incident light.

The tilt angle θ in the above-mentioned non-helical structure is recognized as a half of an angle between the average molecular axis directions of liquid crystal molecules in a twisted alignment in a first orientation state and a second orientation state. According to the above equation, it is shown that a tilt angle θ of 22.5 degrees provides a maximum transmittance and the tilt angle in a non-helical structure for realizing bistability should desirably be as close as possible to 22.5 degrees.

A method for aligning a ferroelectric liquid crystal should desirably be such that molecular layers each composed of a plurality of molecules of a smectic liquid crystal are aligned uniaxially along their normals, and it is desirable to accomplish such an alignment state by-a rubbing treatment which requires only a simple production step. As an alignment method for a ferroelectric liquid crystal, particularly a chiral smectic liquid crystal in a non-helical structure, one disclosed in U.S. Pat. No. 4,561,726 has been known for example.

However, there has been found a problem that, when such a ferroelectric liquid crystal device of a cell structure is continually driven for a long time, the thickness along a cell side is gradually increased to show a pale yellow tint.

If such yellowing occurs on one side of a display cell, the display image quality is impaired. The occurrence of the yellowing is not limited to on a monochromatic image display but also causes a deviation in color balance on a color display, thus hindering a high-quality image display.

Incidentally, such a display device is provided with an electrode matrix comprising scanning electrodes and data electrodes for multiplexing drive of a chiral smectic liquid crystal including sequential application of a scanning signal to the scanning electrodes and application of data signals to the data electrodes in synchronism with the scanning signal.

Further, according to our experiments, it has been found that a tile angle θ (an angle shown in FIG. 6 as described below) in a ferroelectric liquid crystal with a non-helical structure obtained by alignment with an alignment control film of the prior art has become smaller as compared with a tilt angle Ⓗ (the angle Ⓗ is a half of the apex angle of the cone shown in FIG. 5 as described below) in the ferroelectric liquid crystal having a helical structure. Particularly, the tilt angle θ in a ferroelectric liquid crystal with a non-helical structure obtained by alignment with alignment control films of the prior art was found to be generally on the order of 3–8 degrees, and the transmittance at that time was at most about 3 to 5%.

Thus, according to Clark and Lagerwall, the tilt angle in a ferroelectric liquid crystal with a non-helical structure realizing bistability should have the same angle as the tilt angle in the ferroelectric liquid crystal having a helical structure, but in fact the tilt angle θ in a non-helical structure is smaller than the tilt angle Ⓗ in a helical structure. More specifically, it has been found that the tilt angle θ in a non-helical structure becomes smaller than the tilt angle Ⓗ because of a twist alignment of liquid crystal molecules in the non-helical structure. Thus, in a ferroelectric liquid crystal having a non-helical structure, liquid crystal molecules are aligned with a twist from a molecular axis adjacent to an upper substrate to a molecular axis adjacent to a lower substrate continuously at a certain twist angle. This leads to a phenomenon that the tilt angle θ in the non-helical structure is smaller than the tilt angle Ⓗ in the helical structure.

Incidentally, there has been also proposed a ferroelectric liquid crystal device wherein an AC electric field is applied to change an alignment state (Japanese Laid-Open Pat. Application (JP-A) 62-161123). By the application, the tilt angle θ in the non-helical structure can be increased, and the alignment of C-directors between the substrates can be changed from a twist alignment to a parallel alignment (uniform alignment) having almost identical C-directors. As a result, the transmittance in the dark state under cross nicols can be lowered to provide a higher contrast.

SUMMARY OF THE INVENTION

An object of the present invention is to minimize the increase in cell thickness within a liquid crystal cell using a ferroelectric liquid crystal.

An object of the present invention is to prevent or delay the occurrence of the yellowing by rubbing an insulating layer surface.

A further object of the present invention is to suppress the liquid crystal movement in a ferroelectric liquid crystal device, thus preventing the yellowing due to a cell thickness increase or the occurrence of a void.

Another object of the present invention is to provide a ferroelectric liquid crystal device wherein the movement of liquid crystal molecules during a long term drive of the device to provide an improved reliability of display characteristics, such as high contrast and freeness from persistence or after-image.

A further object of the invention is to provide a ferroelectric liquid crystal device wherein the local change in cell thickness during drive is prevented, and a process for producing the device.

Another object of the invention is to provide a process for producing an alignment control film having an unevenness of optimum shape, size and density to minimize the liquid crystal movement while retaining the good alignment characteristic.

A further object of the invention is to provide a ferroelectric liquid crystal device with a large tilt angle θ in a non-helical structure of a chiral smectic liquid crystal, which can realize a display showing a high contrast image free from persistence.

A further object of the invention is to provide a ferroelectric liquid crystal device with an improved device structure by which a latitude of material selection is increased to allow a simple production process at low temperatures which is good at productivity and has a broader latitude of selection of other materials for, e.g., color filter.

According to the present invention, there is provided a ferroelectric liquid crystal device, comprising:

a pair of electrode plates disposed opposite to each other each successively including a substrate, an electrode, an insulating film and an alignment control film, and a ferroelectric liquid crystal disposed between the pair of substrates, wherein at least one of the insulating films contains fine particles dispersed therein.

According to another aspect of the present invention, there is provided a ferroelectric liquid crystal device, comprising: a pair of electrode plates each having an alignment control layer, and a ferroelectric liquid crystal disposed between the electrode plates, wherein at least one of the alignment control layers has a surface unevenness comprising dimples or dots having a diameter of 0.1–10 μm and difference in height of 2–30 nm and formed at a density of at least $10^4/mm^2$.

According to the invention, there is further provided a ferroelectric liquid crystal device, comprising: a cell including a pair of substrates each having thereon an electrode for driving a liquid crystal and disposed opposite to each other, at least one of the substrates further having on the electrode at least one layer of an insulating film and an alignment control film subjected to a uniaxial aligning treatment, and a ferroelectric liquid crystal sandwiched between the pair of oppositely disposed substrates, wherein a plurality of dimples are formed in a depth D at the surface of the alignment control film, satisfying a relationship of da<D<100da with respect to the thickness da of the insulating film.

According to the invention, there is provided a ferroelectric liquid crystal device, comprising: a cell including a pair of substrates each having thereon an electrode for driving a liquid crystal and disposed opposite to each other, at least one of the substrates further having on the electrode at least one layer of an insulating film and an alignment control film subjected to a uniaxial aligning treatment, and a ferroelectric liquid crystal sandwiched between the pair of oppositely disposed substrates, wherein a plurality of fine particles having a diameter Dp dispersed at the surface of the insulating film, satisfying a relationship of da<Dp<100da with respect to the thickness da of the alignment control film.

According to the invention, there is provided a ferroelectric liquid crystal device, comprising: a pair of substrates each provided with a transparent electrode, a polyimide alignment film further provided to at least one of the substrates, and a ferroelectric liquid crystal sandwiched between the substrates, wherein said alignment film is provided with a minute surface unevenness and has a carbon atom ratio at the surface which is larger than that derived from its chemical structure.

According to the invention, there is provided a ferroelectric liquid crystal device, comprising: a pair of substrates each successively having thereon an electrode layer for voltage application, an insulating layer and an alignment film layer, and a ferroelectric liquid crystal disposed between the substrates, wherein said insulating layer has a face closer to the liquid crystal which has been subjected to rubbing.

According to the invention, there is provided a ferroelectric liquid crystal device, comprising: a ferroelectric liquid crystal, and a pair of substrates disposed opposite to each other so as to sandwich the ferroelectric liquid crystal and each having on its opposite surface a transparent electrode for applying voltages to the ferroelectric liquid crystal and an alignment film subjected to a uniaxial aligning treatment for aligning the ferroelectric liquid crystal, wherein said alignment film has a thickness d of at most 100 Å and is formed on an uneven surface having a surface unevenness providing a difference in height of at most 500 Å and an average pitch of unevenness of at most 1000 Å.

According to the invention, there is also provided a ferroelectric liquid crystal device, comprising: a ferroelectric liquid crystal, and a pair of substrates disposed opposite to each other so as to sandwich the ferroelectric liquid crystal and each having on its opposite surface a transparent electrode for applying voltages to the ferroelectric liquid crystal and an alignment film subjected to a uniaxial aligning treatment for aligning the ferroelectric liquid crystal, wherein said ferroelectric liquid crystal is placed in an alignment state showing an increased effective tilt angle formed by application of an AC electric field, and said alignment film is formed on an uneven surface having a surface unevenness providing a difference in height of at most 500 Å and an average pitch of unevenness of at most 1000 Å.

According to the invention, there is provided a liquid crystal device, comprising: a pair of substrates disposed parallel to each other and each successively having thereon a transparent electrode, an insulating layer and an alignment film layer, and a ferroelectric liquid crystal disposed between the substrates, wherein said insulating layer contains fine particles dispersed therein and is formed in a thickness which is smaller than two times the particle size of the fine particles.

According to the invention, there is provided a liquid crystal device, comprising: a pair of substrates each having an electrode thereon, at least one of the substrates further having an the electrode a t least one layer of an insulating film and an alignment control film subjected to a uniaxial aligning treatment, and a ferroelectric liquid crystal sandwiched between the substrates, wherein said insulating film has a surface unevenness comprising dimples or dots having a diameter of 0.1–20 μm and a difference in height of 100–2000 Å and formed at a density of at least 2500/mm².

According to the invention, there is provided a process for producing a ferroelectric liquid crystal device of a cell structure including a pair of electrode plates each comprising an electrode and an alignment film thereon on a substrate and a ferroelectric liquid crystal disposed between the electrode plates, said process comprising steps of:

applying an alignment film-forming solution onto a substrate provided with an electrode to form a wet layer thereon, and leaving the wet layer standing for an aging time before baking, said aging time being set to a length sufficient to provide a surface unevenness to the alignment film after baking required for suppressing a cell thickness change to at most a prescribed value.

According to the invention, there is provided a process for producing a ferroelectric liquid crystal device of a cell structure including a pair of electrode plates each comprising an electrode and an alignment film thereon on a substrate and a ferroelectric liquid crystal disposed between the electrode plates, said process comprising steps of:

dispersing fine particles having a diameter which is at most a gap provided between the substrates within an alignment film-forming solution, applying the alignment film-forming solution to form an alignment film containing the fine particles, and then removing the fine particles to provide the alignment film with a surface unevenness.

According to the invention, there is further provided a process for producing a ferroelectric liquid crystal device including a pair of substrates each provided with a group of electrodes for liquid crystal drive and an insulating layer covering the electrodes, and a ferroelectric liquid crystal disposed between the pair of substrates; said process comprising, for forming the insulating layer on each substrate:

a first step of forming a first insulating layer on a substrate surface provided with a group of electrodes for liquid crystal drive, a second step of dispersing inorganic fine particles having a diameter of at most 1 μm on the substrate surface provided with the first insulating layer, and a third step of forming a second insulating layer on the substrate surface provided with the inorganic fine particles.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 7, 10, 12, 17–19 and 21–22 are, respectively, a schematic sectional view of an embodiment of the liquid crystal device (cell) according to the invention.

FIG. 20 is a schematic plan view of a ferroelectric liquid crystal device according to an embodiment of the invention.

FIGS. 23 and 24 are microscopic pictures showing alignment states obtained by using substrates formed according to a Comparative Example and Example 33, respectively.

FIGS. 28A and 28B are plan views illustrating tilt angles θ in a uniform alignment state and a splay alignment state, respectively.

FIG. 29 is a sectional view showing a charge distribution, a direction of a spontaneous polarization $P_S$ and a direction of a reverse electric field Vrev.

FIG. 30 is a schematic plan view illustrating changes in tilt angle θ during and after application of an electric field.

FIG. 33 is a waveform diagram illustrating driving waveforms used in an embodiment of the present invention.

DESCRIPTION OF THE PREFERRED EMBODIMENTS

We have analyzed the yellowing caused by the increase in cell thickness at the cell side.

Figure 1A:
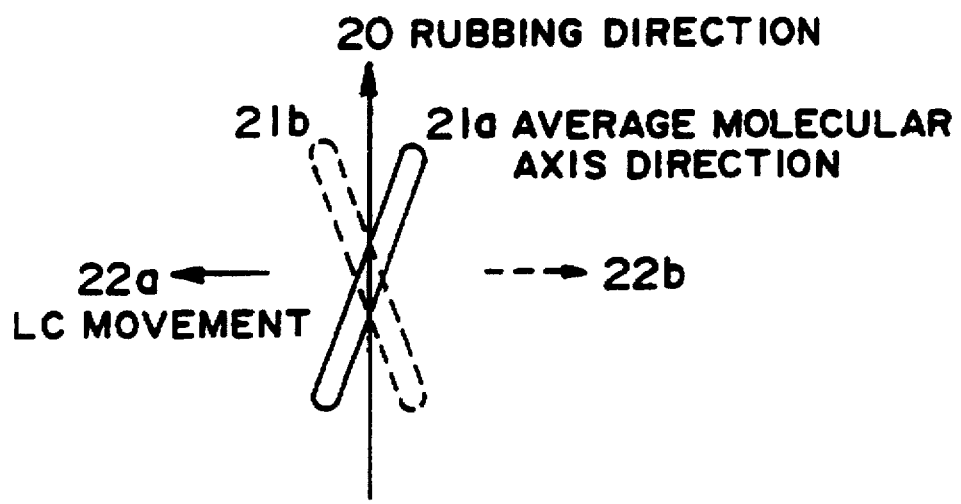
FIGS. 1A and 1B are explanatory views for illustrating a cell thickness increase along a cell side in relation with liquid crystal movement directions.
Figure 1B:
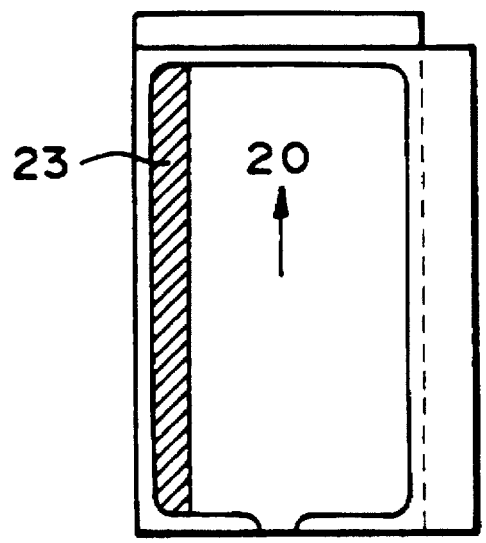

According to our study, the increase in cell thickness at the cell side is recognized to be caused by a pressure increase which in turn is caused by movement of liquid crystal molecules in a particular direction due to driving. Presumably, such a force causing the liquid crystal molecule movement may be attributable to an electrodynamic effect caused by perturbation of liquid crystal molecule dipole moments in an AC-like electric field caused by continuation of drive pulses. Further, according to our experiments, the directions 22a and 22b of the liquid crystal movement are determined in relation with the rubbing direction 20 and the average liquid crystal molecular axis position 21a or 21b as shown in FIG. 1A. As the moving direction of liquid crystal molecules is related with the rubbing direction, the abovementioned phenomenon is assumed to depend on the pretilt state at the substrate surfaces. Referring to FIGS. 1A and 1B, reference numeral 21a (or 21b in a reverse orientation state) denotes an average molecular axis (director) orientation. When the liquid crystal molecules (described herein as having a negative spontaneous polarization) are oriented to provide the average molecular axis 21a and are supplied with a certain strength of AC electric field not causing a switching to the orientation state 21b, the liquid crystal molecules are liable to move in the direction of an arrow 22a in the case where the substrates are provided with rubbing axes extending in parallel and in the same direction 20. This liquid crystal movement phenomenon depends on an alignment state in the cell. More specifically, this phenomenon hardly occurs in C2 alignment but is remarkably observed in C1 alignment and uniform alignment described hereinafter.

Figure 2:
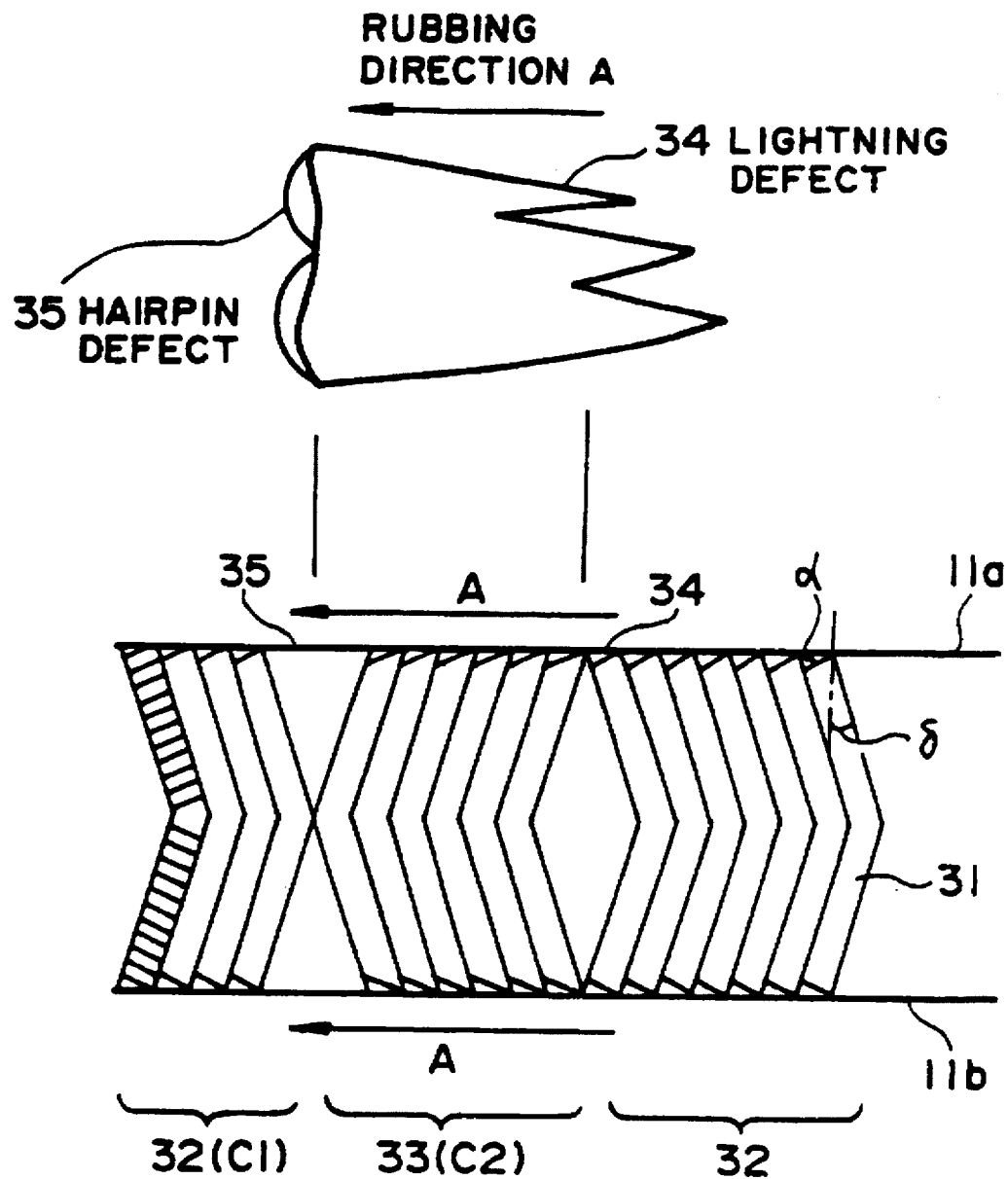
FIG. 2 is an explanatory view for illustrating an alignment state occurring in a chiral smectic liquid crystal used in the invention.

The two alignment states C1 and C2 may be explained by a difference in chevron structure of smectic layers as shown in FIG. 2. Referring to FIG. 2, reference numeral 31 denotes a smectic layer showing ferroelectricity, 32 denotes a C1 alignment region, and 33 denotes a C2 alignment region. A smectic liquid crystal generally has a layer structure and causes a shrinkage of layer pitch when it is transformed from SmA (smectic A) phase into SmC (smectic C) phase or SmC* (chiral smectic C) phase, to result in a structure accompanied with a bending of layers between the upper and lower substrates 14a and 14b (chevron structure) as shown in FIG. 2. The bending of the layers 31 can be caused in two ways corresponding to the C1 and C2 alignment as shown. As is well known, liquid crystal molecules at the substrate surfaces are aligned to form a certain angle α (pre-tilt) as a result of rubbing in a direction A in such a manner that their heads (leading ends) in the rubbing direction are up (or away) from the substrate surfaces 11a and 11b. Because of the pre-tilt, the C1 and C2 alignment states are not equivalent to each other with respect to their elastic energy, and a transition between these states can be caused at a certain temperature or when supplied with a mechanical stress. When the layer structure shown in FIG. 2 is viewed in plan as shown in the upper part of FIG. 2, a boundary 34 of transition from C1 alignment (32) to C2 alignment (33) in the rubbing direction A looks like a zigzag lightning and is called a lightning defect, and a boundary 35 of transition from C2 alignment (33) to C1 alignment (32) forms a broad and moderate curve and is called a hairpin defect.

When FLC is disposed between a pair of substrates 14a and 14b and placed in an alignment state satisfying a relationship of $\widehat{H} < \alpha + \delta$ ... (1), wherein α denotes a pre-tilt angle of the FLC, $\widehat{H}$ denotes a tilt angle (a half of cone angle), and δ denotes an angle of inclination of SmC* layer, there are four states each having a chevron structure in the C1 alignment state. These four C1 alignment states are different from the known C1 alignment state. Further, two among the four C1 alignment states form bistable states (uniform alignment). Herein, two states among the four C1 states giving an apparent tilt angle $\theta_a$ therebetween in the absence of an electric field satisfying a relationship of $\widehat{H} > \theta_a > \widehat{H}/2$ ... (2) are inclusively referred to as a uniform state.

Figure 3B:
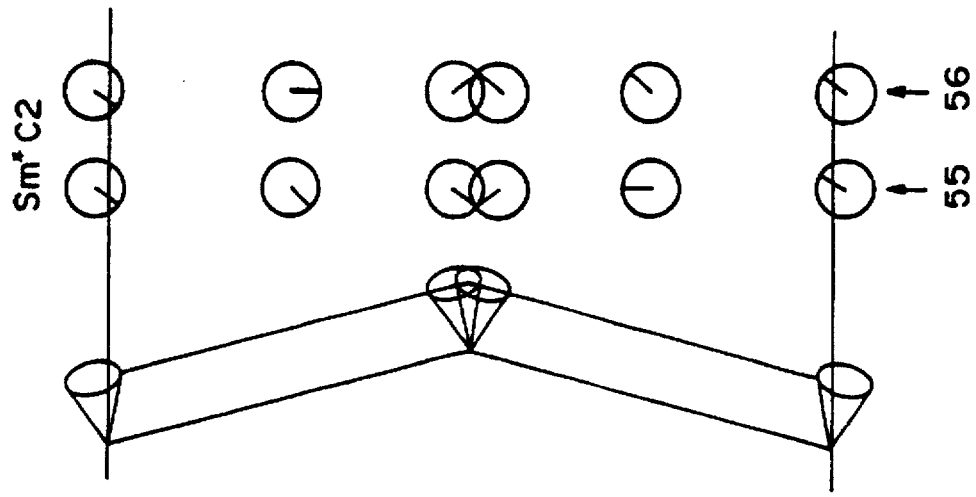
FIGS. 3A and 3B are explanatory views for illustrating changes in d rector orientation according to various positions between substrates in C1 alignment and C2 alignment, respectively.
Figure 3A:
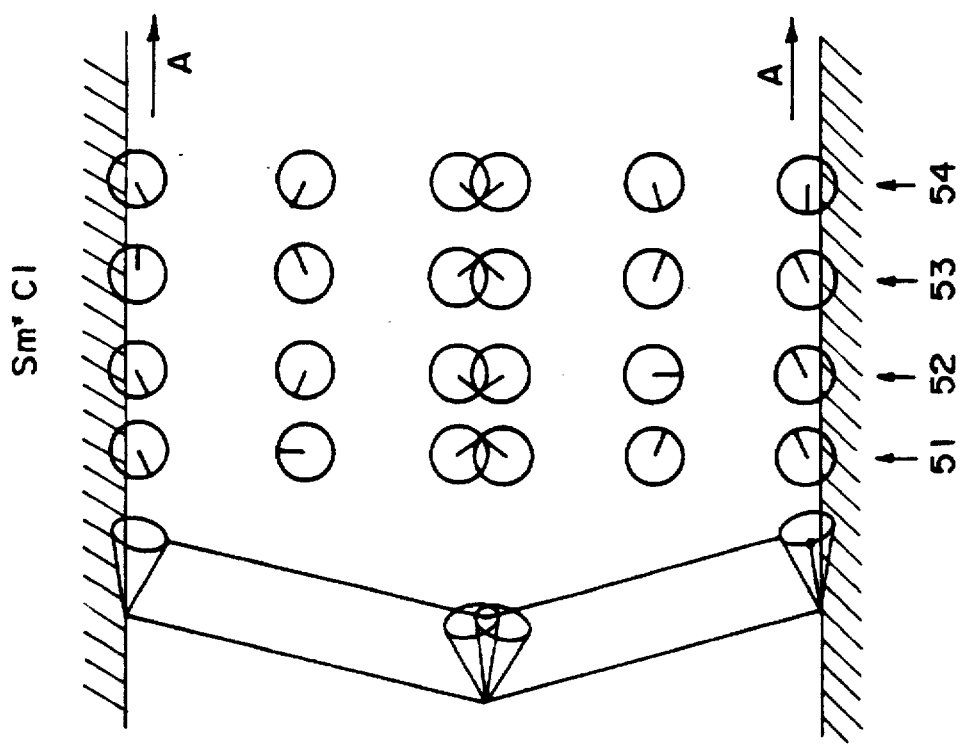

In the uniform state, the directors are believed to be not twisted between the substrates in view of optical properties thereof. FIG. 3A is a schematic view illustrating director positions between the substrates in the respective states in C1 alignment. More specifically, at 51–54 are respectively shown changes in director positions between the substrates in the form of projections of directors onto cone bottoms as viewed from each bottom. At 51 and 52 is shown a splay state, and at 53 and 54 is shown a director arrangement which is believed to represent a uniform alignment state. As is understood from FIG. 3A, at 53 and 54 representing a uniform state, the molecule position (director) is different from that in the splay state either at the upper substrate or lower substrate. FIG. 3B shows two states in C2 alignment between which no switching is observed at the boundaries but an internal switching is observed. The uniform state in C1 alignment provides a larger tilt angle $\theta_a$ and thus a higher brightness and a higher contrast than the conventionally used bistable state in C2 alignment.

However, in a ferroelectric liquid crystal having a uniform alignment state based on the condition of $\widehat{H} > \theta_a > \widehat{H}/2$, the above-mentioned problem of the yellowing due to the liquid crystal movement is liable to occur.

In an actual liquid crystal cell, the liquid crystal movement occurs as shown in FIG. 1A. For example, when the liquid crystal molecules in the entire cell are placed in a state providing an average molecular axis direction 21a, the liquid crystal molecules in the cell are liable to move under AC application in the direction of the arrow 22, i.e., from the right to the left in the figure. As a result, the cell thickness in a region 23 is increased gradually to show a yellowish tint. If the liquid crystal molecules are placed in a state providing an average molecular axis 21b, the liquid crystal movement under AC application is caused in the reverse direction 22b. In either case, the liquid crystal movement is caused in a direction perpendicular to the rubbing direction, i.e., in the direction of extension of smectic layers.

Figure 4:
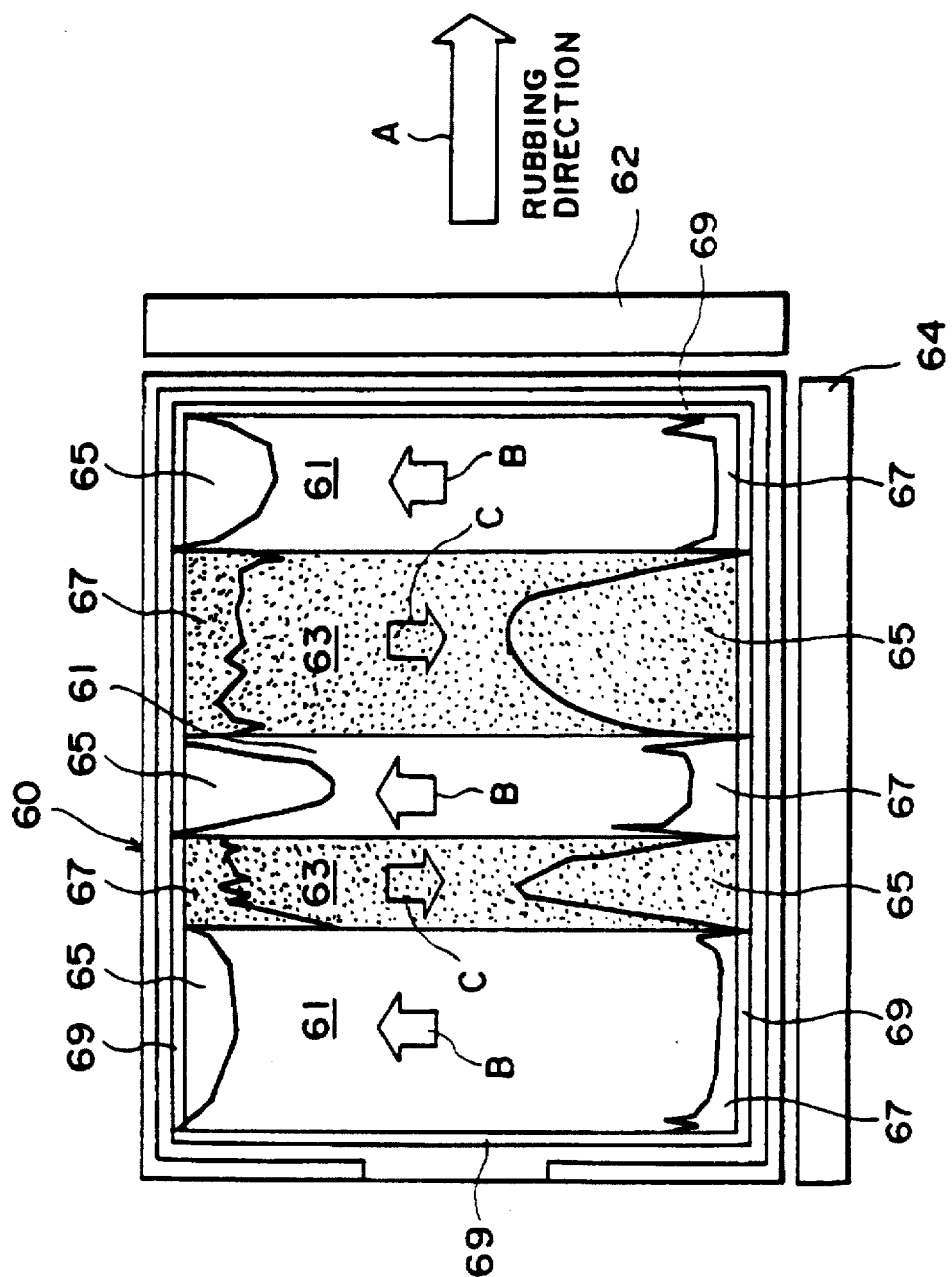
FIG. 4 is a front view of a conventional liquid crystal display apparatus when it is driven for a long time for displaying a fixed pattern.

According to another experiment of ours, when a ferroelectric liquid crystal cell 60 including a ferroelectric liquid crystal of a non-helical structure in a high pre-tilt alignment state in a cell region defined by a sealant 69 is driven by a driver including a scanning electrode driver circuit 62 and a data electrode driver circuit 64 to continuously write in a white (61) or black (63) fixed pattern as shown in FIG. 4, liquid crystal molecules are caused to move in different directions B and C in parallel with the extension direction of chiral smectic C layers and perpendicular to the rubbing direction A corresponding to the molecular positions for displaying a white display state (region 61) and a black display state (region 63), respectively. As a result, at the destination sides of the liquid crystal molecular movement, the liquid crystal layer is caused to have an increased thickness while enlarging the cell gap to form portions 65 colored in pale yellow (yellowing). On the opposite sides of the liquid crystal molecular movement, voids 67 lacking liquid crystal molecules are formed. These phenomena are caused most noticeably in the neighborhood of the seal 69 and propagated toward the inside of the cell.

As described above, we have found that the liquid crystal movement in one direction is caused in a long term of drive to cause a slight change in cell thickness, thus resulting in yellowing or color deviation adversely affecting the display characteristics.

More specifically, in the destination side in the liquid crystal movement direction, the cell thickness is liable to be increased to result in a yellowish tint. On the opposite side, a state with a less amount of liquid crystal results to cause a disorder in alignment. Accordingly, a liquid crystal device causing these phenomena as a-result of long term drive shows a uniformity in display performance which is much worse than the initial state, thus being accompanied with a problem in reliability.

The above-mentioned change in cell thickness cause further difficulties including changes in drive voltage threshold characteristics and adverse effects to durability of the liquid crystal device in a long term of continuous drive.

As a result of further study, we have found that the liquid crystal movement in a planar direction is effectively suppressed by providing a fine surface unevenness pattern to an alignment control layer formed on an electrode plate, so that the above-mentioned problem of cell thickness increase on a cell side can be solved.

Further, we have also found that a specific unevenness pattern (or dimples) provided to the alignment control layer surface can result in a homogeneous alignment with a remarkably suppressed liquid crystal movement.

In other words, we have found that the liquid crystal behavior strongly depends on the physical states of the substrate boundary, i.e., the surfaces of alignment control films, and the liquid crystal movement is remarkably suppressed by an appropriate size of unevenness provided to the alignment control film surfaces.

As stated above, in order for an optical modulation device utilizing bistability to exhibit desirable driving characteristics, it is important that the liquid crystal disposed between a pair of substrates should be in such an alignment state that conversion between two stable states may occur effectively irrespective of the application of an electric field, i.e., in a good uniaxial alignment state.

Further, in order to realize a switching device having a high luminance and a high speed, it is necessary to use a ferroelectric liquid crystal having a large spontaneous polarization. However, in case where a thick alignment film and/or a high-impedance insulating film is used, a large spontaneous polarization can cause a reverse electric field, which can remarkably impair switching characteristic and even cause a failure in operation as a display device in some cases. This should require a caution.

Our experiments have also revealed that too large a decrease in alignment control film thickness so as to reduce the influence of the reverse electric field can impair the homogeneity of ferroelectric liquid crystal alignment, thus causing a failure in function as a display device in some cases.

The above described objects of the present invention can be accomplished by forming an unevenness at the surface of an insulating layer or electrodes constituting a layer beneath an alignment film and/or the surface of an alignment film.

More specifically, in the present invention, a prescribed unevenness is formed at the surface of an insulating layer or electrodes and/or the surface of an alignment film to prevent or decrease the liquid crystal movement, thereby preventing or decreasing the occurrence of the yellowing or occurrence of voids in a cell due to the cell thickness change to provide a ferroelectric liquid crystal device showing a high contrast and little change in display characteristic with time.

Further, in the present invention, the unevenness in the insulating layer, electrodes or alignment film may be produced in a process which is simple and also good at reproducibility.

In the present invention, the unevenness may be formed by baking a precursor layer of an alignment film after lapse of a prescribed time after forming the precursor layer, by incorporating fine particles in a layer forming an alignment film or by removing the fine particles by rubbing to form a surface unevenness in the alignment film. Alternatively, the unevenness may be formed by incorporating fine particles in a layer forming an insulating film and then forming an alignment film on the insulating film or by further rubbing the alignment film to remove the fine particles from the insulating layer to form an unevenness at the surface of the insulating film or alignment film. It is also possible to form the unevenness by first forming an alignment film and then blasting the alignment film surface with fine particles or mechanically stamping the alignment film to form a surface unevenness. These are preferred embodiments and may be appropriately combined as desired.

The unevenness thus formed can vary to some extent depending on factors, such as liquid crystal material used, alignment film material, thicknesses of alignment film and insulating layer, cell gap and conditions for driving the liquid crystal device, but may preferably be as follows.

The unevenness formed in the insulating layer or electrodes may preferably have a width of 0.1–20 μm, a difference in height (as formed between an adjacent pair of convexity and concavity) of 100–2000 Å, more preferably 100–500 Å. In case where the unevenness is composed of individual convexities or/and concavities, the unevenness may preferably be formed at a pitch of at most 1000 Å, more preferably 100–1000 Å, and the convexities or concavities may preferably be formed at a density of at least 2500/mm$^2$.

If the average difference in height formed in the insulating layer or electrodes exceeds 500 Å, the liquid crystal alignment is liable to be disordered because of too large an unevenness while it can depend on the thickness of the alignment film formed thereon. On the other hand, if the average difference in height is below 100 Å, the effect thereof can be insufficient by forming an alignment film thereon in some cases. If the unevenness pitch is below 100 Å, the effect can be insufficient in some cases. If the pitch exceeds 1000 Å, the unevenness distribution is sparse, and the effect thereof can be insufficient in some cases.

In the case where fine particles are incorporated in the insulating layer, the fine particles may preferably have an average particle size (diameter) D satisfying D <50 di, more preferably D <2di, further preferably D >di, wherein di denotes the thickness of the insulating layer, which may be a desired thickness but may preferably be about 30 Å–1 μm, more preferably 40–2000 Å.

The degree of unevenness formed in the insulating layer is closely related with the unevenness of the alignment film formed thereon and is therefore an important factor, but the unevenness formed at the surface of the alignment film directly affect the performance and is therefore more important.

The unevenness formed at the surface of the alignment film may preferably have a difference in height of at most 500 Å, more preferably 20–500 Å, further preferably 20–300 Å, and may preferably be formed at a pitch of at most 1000 Å, more preferably 100–1000 Å, and a density of 10000/mm$^2$, more preferably $10^4$–$2\times10^7$/mm$^2$. The unevenness may have an arbitrary shape but may preferably comprises concavities in the form of dimples or convexities in the form of dots, semispheres or domes because these shapes can be easily formed by using fine particles. Similarly, circular concavities or convexities are also preferred.

The thickness of the alignment film may be set to show an appropriate degree of function of preventing or suppressing the liquid crystal movement while showing a sufficient alignment effect and may preferably be 30 Å–1 μm, more preferably be 50–1000 Å, further preferably at most 100 Å.

The dimples or concavities formed may have a depth Dd satisfying da<Dd<100da with respect to the thickness da of the alignment film.

The present invention is most effective when applied to a liquid crystal device using a ferroelectric liquid crystal, particularly a ferroelectric liquid crystal showing a larger pretilt angle, more specifically of at least 5 degrees, more preferably at least 10 degrees, further preferably at least 15 degrees.

Figure 5:
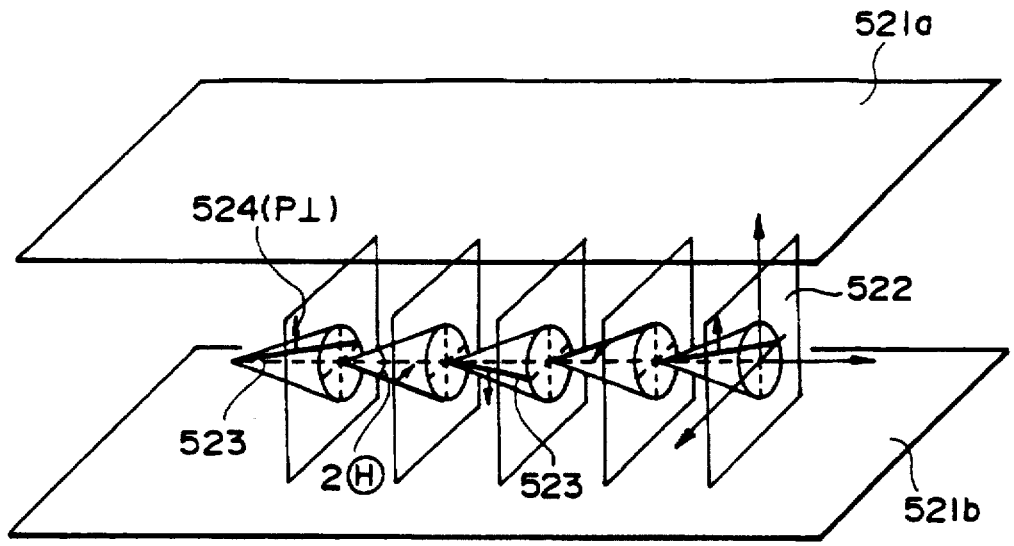
FIG. 5 is a perspective view showing schematically an alignment of a chiral smectic liquid crystal having a helical structure.
Figure 6:
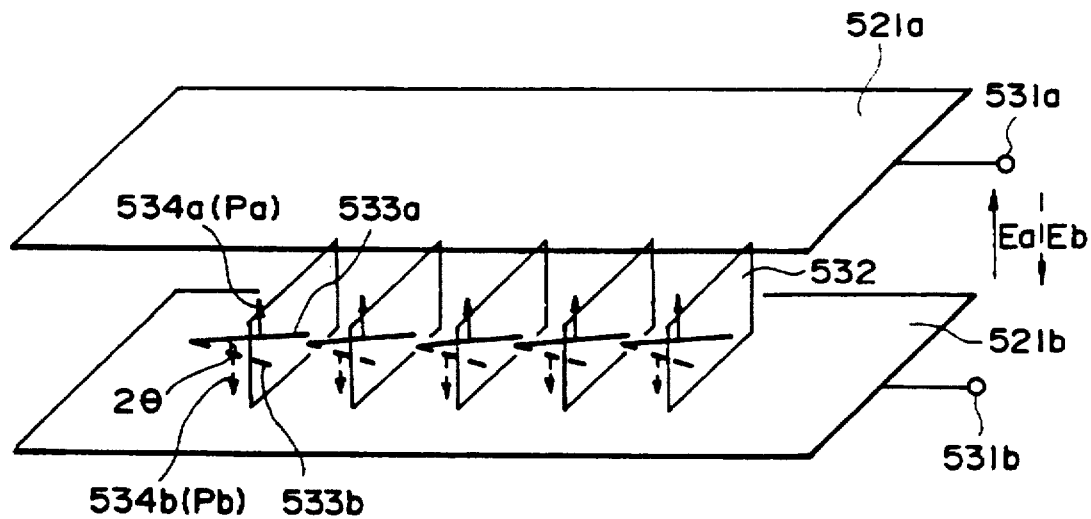
FIG. 6 is a perspective view showing schematically an alignment state of a chiral smectic liquid crystal having a non-helical structure.

The operation of a ferroelectric liquid crystal is explained with reference to schematic perspective views of liquid crystal cells as shown in FIGS. 5 and 6.

FIG. 5 is a schematic illustration of a ferroelectric liquid crystal cell (device) for explaining operation thereof. Reference numerals 521a and 521b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 522 are aligned perpendicular to surfaces of the glass plates is hermetically disposed therebetween. Full lines 523 show liquid crystal molecules. Each liquid crystal molecule 523 has a dipole moment ($P_{\perp}$) 524 in a direction perpendicular to the axis thereof. The liquid crystal molecules 523 continuously form a helical structure in the direction of extension of the substrates. When a voltage higher than a certain threshold level is applied between electrodes formed on the substrates 521a and 521b, a helical structure of the liquid crystal molecule 523 is unwound or released to change the alignment direction of respective liquid crystal molecules 523 so that the dipole moment ($P_{\perp}$) 524 are all directed in the direction of the electric field. The liquid crystal molecules 523 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Further, when the liquid crystal cell is made sufficiently thin (e.g., 0.1–3 microns), the helical structure of the liquid crystal molecules is unwound to provide a non-helical structure even in the absence of an electric field, whereby the dipole moment assumes either of the two states, i.e., Pa in an upper direction 534a or Pb in a lower direction 534b as shown in FIG. 6, thus providing a bistable condition. When an electric field Ea or Eb higher than a certain threshold level and different from each other in polarity as shown in FIG. 6 is applied to a cell having the above-mentioned characteristics, the dipole moment is directed either in the upper direction 534a or in the lower direction 534b depending on the vector of the electric field Ea or Eb. In correspondence with this, the liquid crystal molecules are oriented in either of a first stable state 533a and a second stable state 533b.

A first advantage attained by using such a ferroelectric liquid crystal cell is that the response speed is quite fast, and a second advantage is that the orientation of the liquid crystal shows bistability. The second advantage will be further explained, e.g., with reference to FIG. 6. When the electric field Ea is applied to the liquid crystal molecules, they are oriented in the first stable state 533a. This state is stably retained even if the electric field is removed. On the other hand, when the electric field Eb of which direction is opposite to that of the electric field Ea is applied thereto, the liquid crystal molecules are oriented to the second stable state 533b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Figure 12:
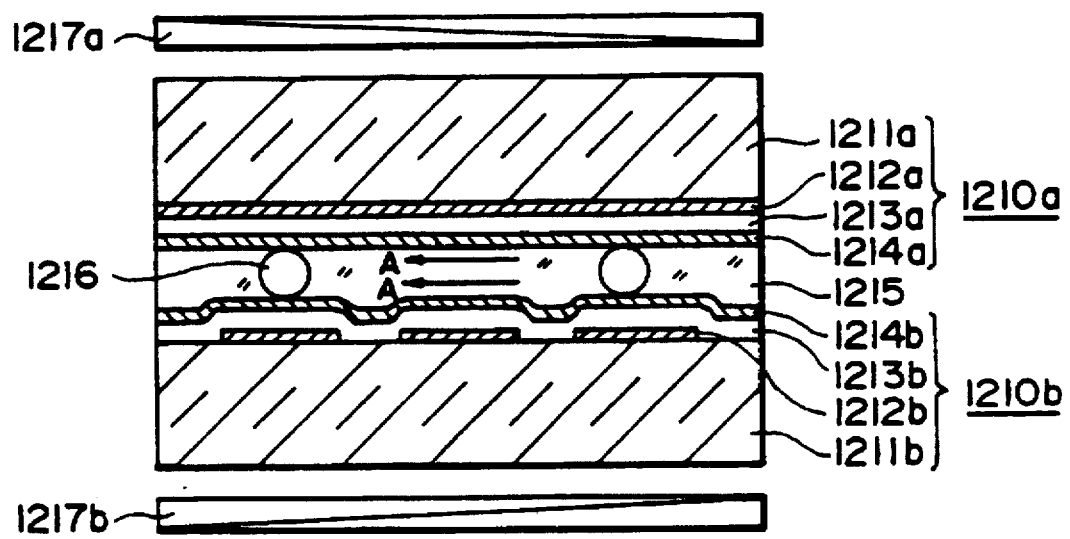

Hereinbelow, some embodiments of the ferroelectric liquid crystal device according to the present invention will be described. FIG. 12 is a schematic sectional view of an embodiment of the ferroelectric liquid crystal device (cell) according to the present invention.

Referring to FIG. 12, the liquid crystal cell includes a pair of an upper substrate 1211a and a lower substrate 1211b disposed in parallel with each other and provided with, e.g., about 400 to 3000 Å-thick transparent electrodes 1212a and 1212b, respectively. On the transparent electrodes 1212a and 1212b are respectively formed, e.g., 100–3000 Å-thick insulating films 1213a and 1213b and alignment control layers (films) 1214a and 1214b. Herein, each combination of the members 1211a–1214a and the members 1211b–1214b may be referred to as an electrode plate, including the case where some members other than the electrodes are omitted. Between an upper electrode plate 1210a including the upper substrate 1211a and a lower electrode plate 1210b including the lower substrate 1211b, there is disposed a ferroelectric smectic liquid crystal 1215 preferably in a non-helical structure providing at least two stable states.

The insulating films 1212a and 1212b may comprise an inorganic oxide film formed by wet application and baking or may comprise a sputtered film. Each insulating film can have a laminated structure including two or more layers.

The alignment control layers 1214a and 1214b may have a thickness in the above-described range but may preferably have a thickness of 5–100 nm (50–1000 Å), preferably 15–40 nm (150–400 Å). The alignment control layers may comprise generally a polymer but may suitably comprise a film providing a high pretilt angle, e.g., a film of a fluorine-containing polyimide.

According to the present invention, at least one, preferably both, of the alignment control layers 1214 and 1214b are provided with a surface unevenness including concavities (or convexities) having a diameter of 0.1–10 μm, preferably 0.3–4 μm and a difference in height of 2–30 nm, preferably 5–15 nm at a density of at least $10^4/mm^2$, preferably $2 \times 10^7/mm^2$. If the diameter is below 0.1 μm, the desired effect of suppressing the liquid crystal movement can be insufficient and, if the diameter exceeds 10 μm, it is liable to cause alignment defects.

The shape of the unevenness (dots or dimples) may preferably be substantially circular as described above but can also have an oval or irregular shape. In case of a shape other than a circle, the above-mentioned diameter of 0.1–10 μm may be determined based on the shorter diameter.

If the difference in height of the unevenness pattern is below 20 Å, the desired effect of suppressing the liquid crystal movement can be insufficient and, in excess of 300 Å, alignment defects can be caused thereby.

The unevenness dots or dimples may preferably be present at a density of $10^4/mm^2$, more preferably $1 \times 10^5 - 2 \times 10^7/mm^2$, so as to obtain a desired effect of suppressing the liquid crystal movement. The shape thereof can also be a complex one, such that individual dots or dimples include finer dots or dimples therein. In case where the unevenness dots or dimples are present at a high density and continuously at a glance, the above-mentioned diameter and difference in height may be satisfied by individual concavities (dimples) or convexities (dots).

The unevenness pattern may be formed in the alignment control layer in various manners, e.g., by the following methods 1)–4).

1) A solution for preventing an alignment control layer including a mixture solvent comprising a primary solvent and a subsidiary solvent having a higher boiling point than the primary solvent is applied on an electrode plate and baked to form an alignment control layer having an unevenness pattern.

In this instance, the primary solvent may be a good solvent showing a good solvency to the alignment control layer-forming resin (or its precursor) and having a boiling point in the range of preferably 140°–210° C., and may comprise at least one species selected from, e.q., N-methylpyrrolidone, n-butyl cellosolve, dimethylacetamide, dimethylformamide, and dimethylsulfoxide. On the other hand, the subsidiary solvent may preferably be a solvent having a boiling point which is higher by 20°–40° C. than that of the primary solvent and lower by 20°–40° C. than the baking temperature for forming the alignment control layer (e.g., 200°–270° C.) and showing a good solvency to the alignment control layer-forming resin and a good miscibility with the primary solvent. The subsidiary solvent may preferably comprise at least one species selected from, e.g., n-butyl carbitol, n-propyl carbitol, and cresol.

The subsidiary solvent may preferably be used in an amount constituting 10–70 wt. %, particularly 20–60 wt. %, of the total solvent. The alignment control layer-forming resin (or its precursor) may preferably be dissolved at a relatively low concentration, e.g., 1–10 wt. %, particularly 2–6 wt. %, so as to provide a uniformly thin film.

The thus-formed alignment control layer-forming resin solution, after being applied onto an electrode plate, is aged at a temperature around room temperature (e.g., 20°–30° C.) for at least 30 min., preferably at least 60 min., and then baked at, e.g., 200°–270° C. to form an alignment control layer. During the baking or temperature increase for the baking, the desired unevenness pattern is formed principally due to volatilization of the subsidiary solvent.

Alternatively, an unevenness pattern may be formed at the surface of the insulating film by applying an insulating film-forming resin solution containing at least two solvents having different boiling points, preferably including a primary solvent and a poor solvent having a higher boiling point than the primary solvent. Specific examples of the primary solvent may include: toluene; polyhydric alcohols or their derivatives, such as diethyl cellosolve, methyl cellosolve, diacetone alcohol, methoxymethoxyethanol, butyl cellosolve, diethyl carbitol, dibutyl cellosolve, methyl carbitol, ethyl carbitol, dibutyl carbitol, butyl carbitol, n-butyl acetate, and ethoxypropanol. Examples of the poor solvent may include n-methylpyrrolidone and γ-butyrolacetone.

2) An alignment control layer is once formed and then provided with a surface unevenness pattern by blasting with fine particles.

The fine particles used therefor may preferably comprise fine uniform particles of ice prepared, e.g., by spraying pure water through a spray nozzle into fine particles and then quenching the particles with liquid nitrogen. Other examples of the fine particles may include fine particles with a uniform diameter of inorganic oxides, such as silica, alumina, cerite and zirconia. The fine particles may preferably have an average diameter in the range of 5–50 μm.

3) An alignment control layer is once formed and then provided with a surface unevenness pattern by stamping for transfer of a surface unevenness pattern of the stamper.

In this instance, the difference in height of the unevenness pattern may be arbitrarily set by changing the stamping pressure. The unevenness may be obtained in various patterns by changing the surface unevenness pattern of the stamper.

4) An alignment control layer-forming solution containing fine particles having a diameter which is identical to or smaller than the gap formed between a pair of electrode plates is applied onto an electrode plate and then heated to form a layer, from which the fine particles are removed to provide a surface unevenness pattern during the course of forming the alignment control layer.

As described above, the fine particles may preferably have a particles size which is identical to or smaller than the gap to be formed between the pair of electrode plates. The lower limit of the particle size may preferably be at least 15 times the thickness of the alignment control layer for easiness of removal thereof.

The fine particles may preferably have a heat resistance of at least 200° C., particularly at least 300° C., so as to be durable in the baking for the formation of the alignment control layer.

The removal of the fine particles may be performed during rubbing as a uniaxial aligning treatment after the formation of the alignment control layer by baking. The removal of the fine particles may also be performed by ultrasonic washing of the electrode plate within a liquid comprising at least one of organic solvent and water. The ultrasonic washing of the electrode plate can also be performed as a post-treatment after the uniaxial aligning treatment.

In the above methods 1)–3), it is generally preferred to effect the uniaxial aligning treatment after the provision of the unevenness pattern. In the methods 2) and 3), however, the unevenness pattern can also be provided after the uniaxial aligning treatment.

In the present invention, the ferroelectric liquid crystal may be used in a chiral smectic phase, more specifically in chiral smectic C phase (SmC*), H phase (SmH*), I phase (SmI*), K phase (SmK*), G phase (SmG*) or F phase (SmF*).

Details of ferroelectric liquid crystals are described, e.g., in Journal De Physique Letters 36 (L-69), 1975, "Ferroelectric Liquid Crystals"; Applied Physics Letters 36 (11), 1980, "Submicro Second Bistable Electrooptic Switching in Liquid Crystals"; Solid State Physics (Kotai Butsuri), 16 (141), 1981, "Liquid Crystal"; U.S. Pat. Nos. 4,561,726, 4,589,996, 4,592,858, 4,596,667, 4,613,209, 4,614,609, and 4,662,165. Ferroelectric liquid crystals disclosed in these references may be used in the present invention.

A particularly preferred class of ferroelectric liquid crystal may include those showing cholesteric phase on a higher temperature side, which may for example include a pyrimidine-based mixture liquid crystal showing the following phase transition series.

The ferroelectric liquid crystal device shown in FIG. 12 may be obtained by dispersing spacer beads 1216 of, e.g., silica or alumina on the alignment control layer of either one of the pair of electrode plates 1210a and 1210b, then combining the electrode plates so that the uniaxial alignment directions A provided to the alignment control layers 1214a and 1214b are substantially parallel and in the same direction as shown (or substantially parallel and in the opposite direction), and bonding the electrode plates with an optional particulate adhesive used in combination with the spacer beads 1216 and with an epoxy adhesive for sealing the periphery to form a blank cell having an injection port. Then, the cell is filled with a liquid crystal 1215 as described above heated to a temperature preferably giving cholesteric phase or a higher temperature phase and, after sealing the injection port, is cooled to a temperature giving the chiral smectic phase. Then, the cell is sandwiched between a pair of polarizers 1217a and 1217b disposed in a positional relationship of cross nicols.

Figure 22:
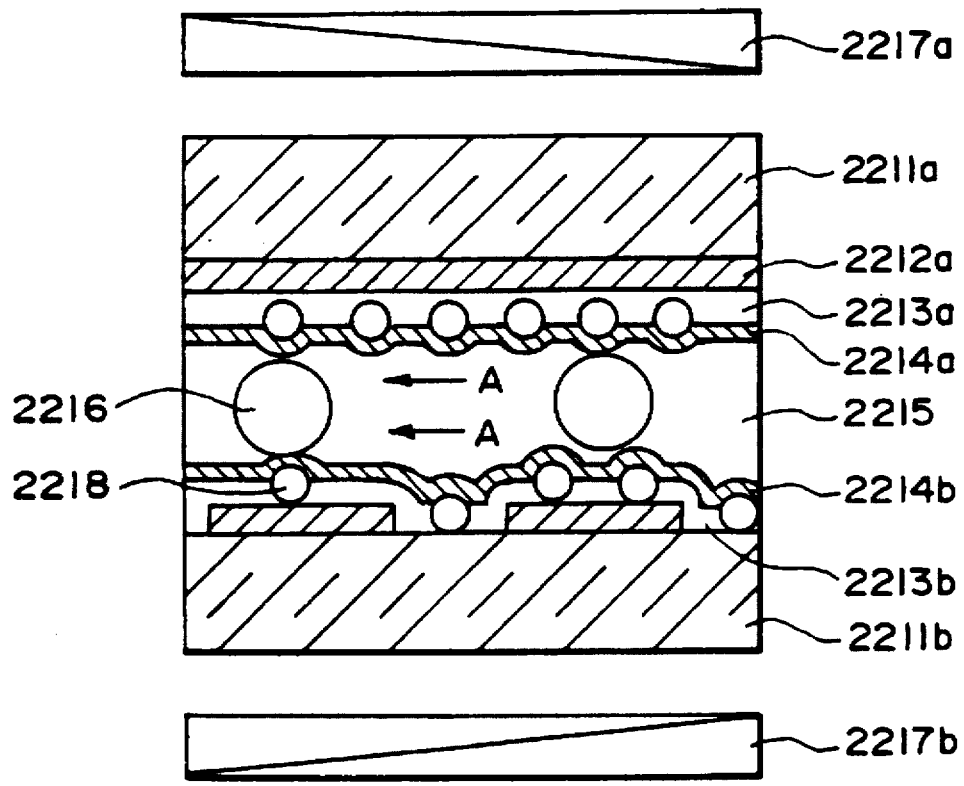

Hereinbelow, an embodiment of the liquid crystal device using an insulating film containing fine particles. FIG. 22 is a schematic sectional view of such an embodiment. Referring to FIG. 22, the device includes substrates (glass plates) 2211a and 2211b coated with transparent electrodes 2212a and 2212b, respectively, of, e.g., $In_2O_3$ or ITO (indium tin oxide) and then with 50 to 2000 Å-thick insulating films 2213a and 2213b (of, e.g., Ti—Si) and with 50 to 1000 Å-thick alignment films 2214a and 2214b, respectively. In this embodiment, the insulating layers 2213a and 2213b contain fine particles of, e.g., silica and alumina. The alignment films 2214a and 2214b have been rubbed in directions A which are parallel and in the same direction. Between the substrates 2211a and 2211b is disposed a ferroelectric chiral smectic liquid crystal 2215. The spacing between the substrates 2211a and 2211b is set to a small value (e.g., 0.1–3 μm) sufficient to suppress the formation of a helical structure of the chiral smectic liquid crystal so that the chiral smectic liquid crystal 2215 is placed in a bistable alignment state. The sufficiently small spacing for the liquid crystal 2215 is held by spacer beads 2216 (of e.g., silica or alumina) disposed between the alignment films 2214a and 2214b. The entire cell is sandwiched between polarizers 2217a and 2217b.

The alignment films used in the present invention are not specifically limited but may preferably comprise a polyimide or polyamide, e.g., as represented by the following formula (1) and (2):

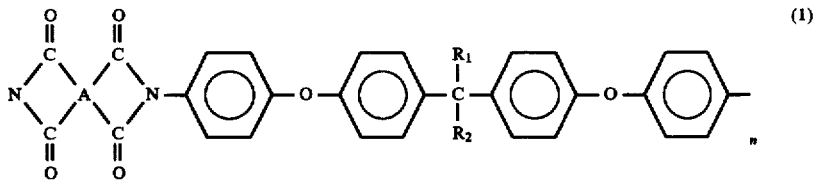

wherein A denotes a tetravalent organic residue group, and $R_1$ and $R_2$ denote an alkyl or fluoroalkyl group each having 1–10 carbon atoms with the proviso that $R_1$ and $R_2$ may be the same or different.

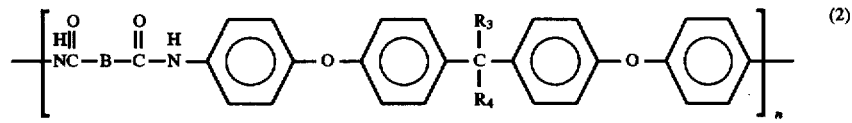

wherein B denotes a divalent organic residue group, and $R_3$ and $R_4$ denote an alkyl or fluoroalkyl group each having 1–10 carbon atoms with the proviso that $R_3$ and $R_4$ may be the same or different.

In order to form the insulating film, a solution at a concentration of 0.01–40 wt. % is formed by using a solvent, such as hexylene glycol, n-butyl cellosolve and iso-propyl alcohol, and applied onto a substrate by a method, such as spinner coating, spray coating or roller coating. In this instance, fine particles are dispersed in the solution by ball milling or ultrasonic dispersion in advance. The coating on the substrate may be pre-baked for evaporation of the solvent at 60°–150° C. for about 10 min., irradiated with ultraviolet rays and then baked for about 1 hour to 250°–350° C. The insulating layer may have a thickness on the order of 30Å–1 μm, preferably 50–2000 Å.

The thus formed insulating film is provided with a minute unevenness, which may function like columns formed by oblique evaporation to align liquid crystal molecules along inclined sides thereof. This may be the reason why a high contrast alignment is obtained thereby.

In order to form the alignment film, a solution at a concentration of 0.01–40 wt. % is formed by using a solvent, such as dimethylformamide, dimethylacetamide, dimethyl sulfoxide, and N-methyl-2-pyrrolidone, and applied onto a substrate by a method, such as spinner coating, spray coating or roller coating, followed by heating at 100°–300° C., preferably 150–250° C., to form an alignment film. The alignment film is then subjected to rubbing with, e.g., cloth.

Figures 25, 26, 27:
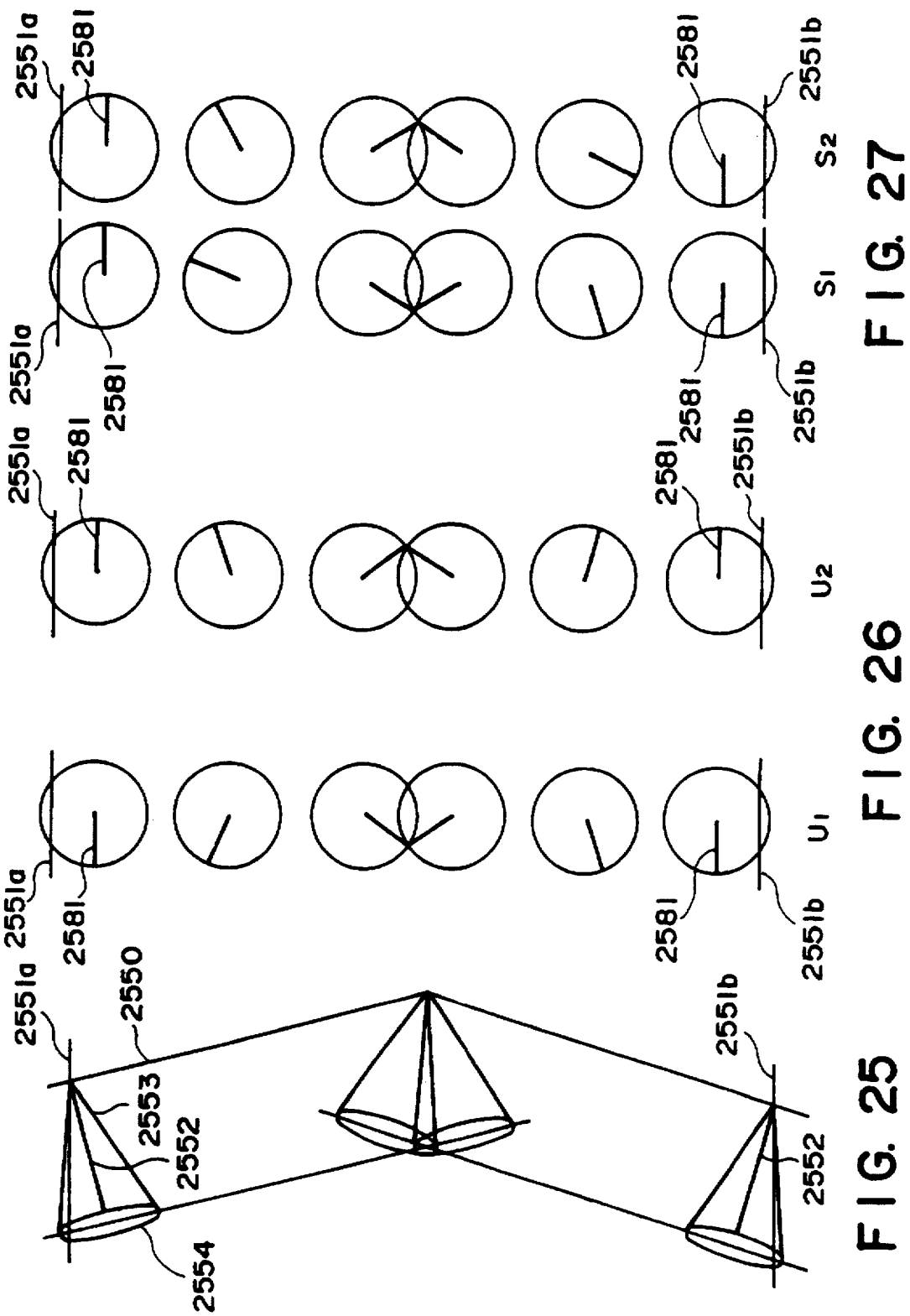
FIG. 25 is a schematic sectional view showing an alignment state of a chiral smectic liquid crystal aligned according to the present invention.
FIG. 26 is an illustration of C-director alignments in a uniform alignment state.
FIG. 27 is an illustration of C-director alignments in a splay alignment state.

FIG. 25 is a schematic sectional view showing an alignment state of liquid crystal molecules attained by using a polyamide complex alignment film in the liquid crystal device according to the present invention, and FIG. 26 is a view showing alignment of corresponding C-directors.

Reference numerals 2551a and 2551b in FIG. denote upper and lower substrates, respectively. Numeral 2550 denotes a molecular layer composed of liquid crystal molecules 2552, and liquid crystal molecules 2552 are aligned so as to change their positions along the bottom face 2554 (circular) of a cone 2553. FIG. 26 more specifically shows a change in C-directors. Referring to FIG. 26, at $U_1$ are shown C-directors 2581 (each being a projection of a molecular long axis onto an imaginary plane perpendicular to the normal to a molecular layer 2550) in one stable orientation state, and at $U_2$ are shown C-directors 2581 in the other stable orientation state.

On the other hand, an alignment state attained by a conventional rubbing-treated polyimide film may be represented by a C-director diagram of FIG. 27, which shows an alignment state wherein molecular axes are twisted in a large degree from the upper substrate 2551a to the lower substrate 2551b to provide a smaller tilt angle θ.

FIG. 28A is a schematic plan view illustrating a tilt angle θ in an alignment state where C-directors 2581 assume a state shown in FIG. 26 (referred to as "uniform alignment state"), and FIG. 28B is a schematic plan view illustrating a tilt angle θ in an alignment state where C-directors 2581 assume a state shown in FIG. 27 (referred to as "splay alignment state"). In these figures, reference numeral 2560 denotes a rubbing axis provided to the above-mentioned fluorine-containing polyimide film, numeral 2561a denotes an average molecular axis in the orientation state $U_1$, numeral 2561b denotes an average molecular axis in the orientation state $U_2$, numeral 2562a denotes an average molecular axis in the orientation state $S_1$, and numeral 2562b denotes an average molecular axis in the orientation state $S_2$. The average molecular axes 2561a and 2561b can be switched to each other by applying voltages of mutually opposite polarities. Similar switching is caused between the average molecular axes 2562a and 2562b.

Next, the effectiveness of the uniform alignment state with respect to a delay in optical response (after-image) due to a reverse electric field Vrev is explained.

If the capacitance of an insulating layer constituting a liquid crystal cell is denoted by Ci, the capacitance of a liquid crystal layer is denoted by $C_{LC}$ and the spontaneous polarization of the liquid crystal is denoted by $P_S$. Vrev causing after-image is expressed by the following equation.

$$Vrev=2P_S/(Ci+C_{LC})$$

FIG. 29 is a schematic sectional view illustrating changes in charge distribution direction of $P_S$ and direction of the reverse electric field in a liquid crystal cell. At FIG. 29(a), there is shown a distribution of $\oplus$ and $\ominus$ charges in a memory state before application of a pulse electric field, where the spontaneous polarization is directed from $\oplus$ charges to $\ominus$ charges. At FIG. 29(b) is shown a state immediately after removal of a pulse electric field, when the direction of the spontaneous polarization $P_S$ is opposite to that shown at FIG. 29(a) (thus, the liquid crystal molecules are inverted from one stable orientation state to the other orientation state) but the distribution of the $\oplus$ and $\ominus$ charges is similar to that shown at FIG. 29(a), so that a reverse electric field Vrev is generated as indicated by an arrow shown at FIG. 29(b). The reverse electric field Vrev disappears in a short time to provide a distribution of $\oplus$ and $\ominus$ charges as shown at FIG. 29(c).

Figure 31:
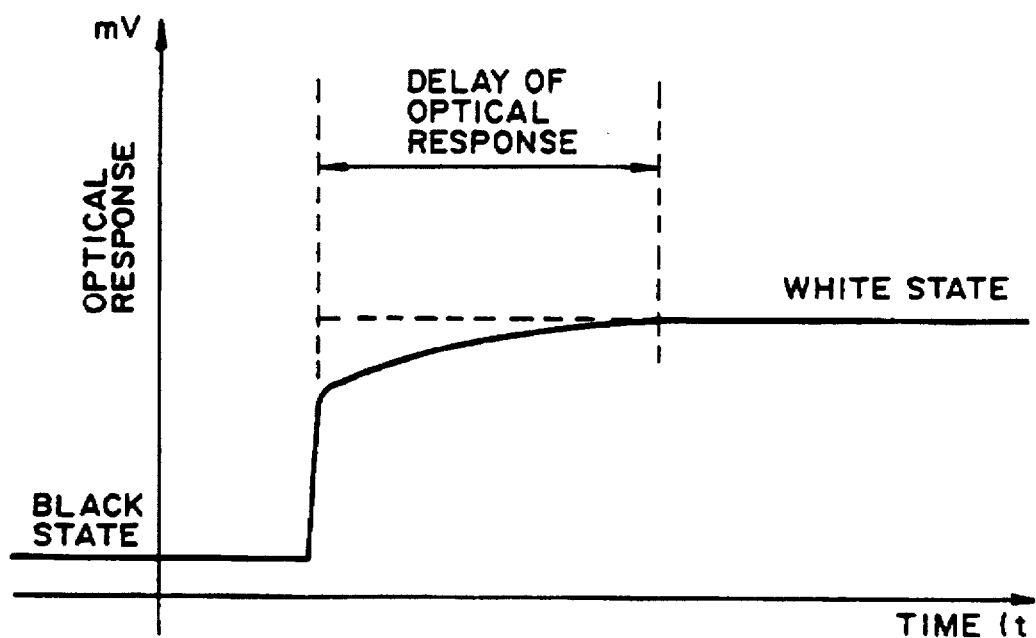
FIGS. 31 and 32 are graphs showing optical response characteristics according to a conventional device and the present invention, respectively.

FIG. 30 is a plan view showing a change in optical response in a splay alignment state given by a conventional polyimide alignment film in terms of a change in tilt angle θ. Referring to FIG. 30, at the time of application of a pulse electric field, the orientation of liquid crystal molecules is changed from an average molecular axis S(A) in a splay alignment state to be overshot to an average molecular axis $U_2$ in a uniform alignment state close to that providing a maximum tilt angle Ⓗ along a path denoted by an arrow $X_1$, and immediately after the removal of the pulse electric field, the orientation is changed along a path denoted by an arrow $X_2$ to an average molecular axis S(B) in a splay alignment state providing a decreased tilt angle θ due to the action of the reverse electric field Vrev shown at FIG. 29(b). Then, as the reverse electric field Vrev attenuates as shown at FIG. 29(c), the orientation is changed along a path denoted by an arrow $X_3$ to an average molecular axis S(C) in a splay alignment state providing a stable orientation state having a somewhat increased tilt angle θ. The resultant optical response in this case is shown in FIG. 31.

Figure 32:
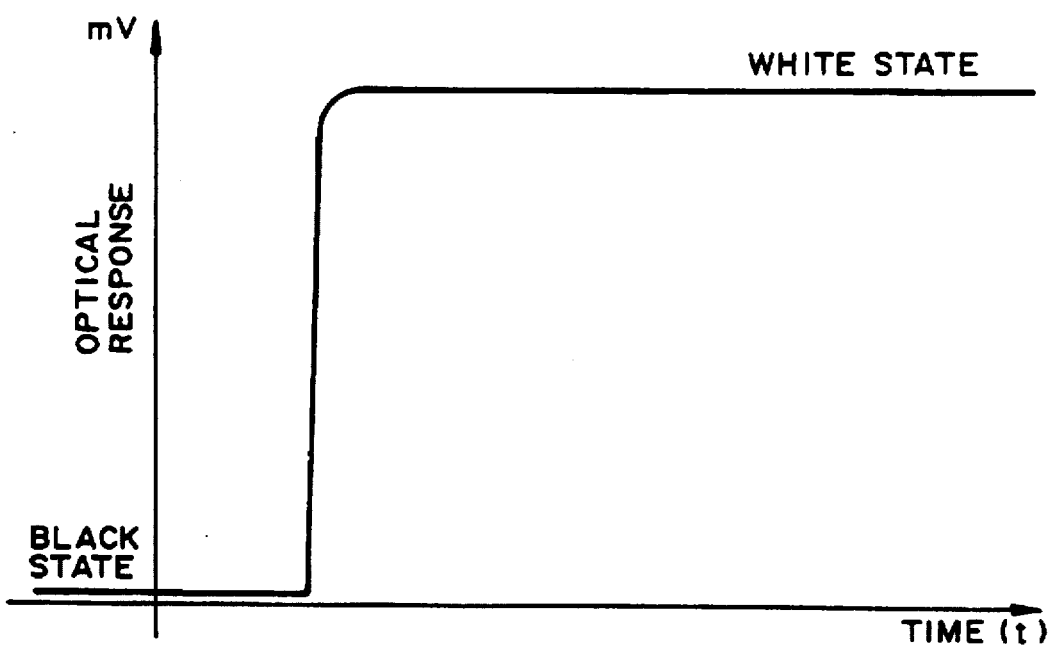

In the alignment state given by using the polyimide film obtained by using a naphthalenetetra-carboxylic acid of the present invention, the average molecular axes S(A), S(B) and S(C) in the splay alignment state shown in FIG. 9 are not caused but it is possible to form an alignment state with an average molecular axis giving a tilt angle θ which is close to a maximum tilt angle Ⓗ. An optical response at this time according to the present invention is shown in FIG. 32. FIG. 32 shows that a delay in optical response causing after-image is obviated and a high contrast in memory states is caused.

The above-mentioned object of the present invention is better accomplished if the alignment film provided with a surface unevenness is further caused to have a controlled carbon atom content. Such an embodiment can be described also based on FIG. 12. Thus, referring to FIG. 12, the device includes substrates (glass plates) 1211a and 1211b coated with transparent electrodes 1212a and 1212b, respectively, of, e.g., $In_2O_3$ or ITO (indium tin oxide) and then with 50 to 2000 Å-thick insulating films 1213a and 1213b (of, e.g., $SiO_2$, $TiO_2$ or $Ta_2O_5$) and with 50 to 1000 Å-thick alignment films 1214a and 1214b, respectively of a polyimide as described above. The alignment films 1214a and 1214b have been rubbed in directions A which are parallel and in the same direction. Between the substrates 1211a and 1211b is disposed a ferroelectric chiral smectic liquid crystal 1215. The spacing between the substrates 1211a and 1211b is set to a small value (e.g., 0.1–3 μm) sufficient to suppress the formation of a helical structure of the chiral smectic liquid crystal so that the chiral smectic liquid crystal 1215 is placed in a bistable alignment state. The sufficiently small spacing for the liquid crystal 1215 is held by spacer beads 1216 (of e.g., silica or alumina) disposed between the alignment films 1214a and 1214b. The entire cell is sandwiched between polarizers 1217a and 1217b.

The polyimide alignment films 1214a and 1214b are provided with surface minute unevenness or projections and may preferably have a carbon atom ratio which exceeds a theoretical value derived from its chemical structure (i.e., a ratio of number of carbon atoms to a number of atoms of another species, such as O (oxygen) in the recurring unit). We have discovered that an improved effect of suppressing the liquid crystal movement is accomplished thereby. This may be attributable to an enhanced effect of suppressing liquid crystal molecular movement due to an appropriate degree of interaction with liquid crystal molecules by a carbon-rich surface in addition to the physical suppressing effect attained by the surface unevenness.

The above polyimide alignment film may be formed by (1) a method of using a coating liquid comprising two or more solvents having different boiling points and solvencies, (2) a method of applying a coating liquid containing fine particles dispersed therein, followed by drying, or (3) a method of chemical or physically etching a flat coating film formed by an ordinary method. The method (1) is preferred because of its simplicity.

The polyimide alignment film may preferably have a surface unevenness or projections having a size of about 500–10000 Å and a difference in height of about 10–500 Å, and also a carbon atom ratio at the surface which is larger by about 0.5 (in terms of the number of increased carbon atom per recurring unit) than that derived from its chemical structure. Herein, such an increase in carbon content may be attributable to fixation of carbon atoms from a carbon-containing solvent during the baking for formation of the alignment film.

The above polyimide alignment film may be formed on a substrate by dissolving a polyamic acid as a polyimide precursor in a solvent system appropriate for controlling the surface state at a concentration of 0.01–40 wt. %, applying the solution by spinner coating, spray coating or roller coating and heating the coating at a temperature of 100°–350° C., preferably 200°–300° C., to cause dehydrocyclization to form a polyimide film, which is then rubbed with, e.g., cloth. The polyimide alignment film in the present invention may have a thickness of about 30 Å1 μm, preferably 200–2000 Å. In this instance, it is possible to omit the insulating film 1213a and/or 1213b. When the polyimide alignment film is formed on such an insulating film 1213a and 1213b, the polyimide alignment film may be set to a thickness of at most 500 Å, preferably at most 300 Å.

The polyimide alignment film according to the present invention described above effectively suppresses the liquid crystal molecular movement during a long-term drive of a device due to both a physical surface shape effect and a chemical interaction with the liquid crystal molecules, thus providing an improved reliability of uniform display characteristic.

The carbon atom concentration of the alignment film referred to herein are based on the measurement of an angle change by XPS (X-ray photoelectron spectroscopy).

The alignment film in the present invention is not restricted to a specific structure if the above condition is satisfied but may include polyimides prepared in the following manner as preferred examples.

Examples of the tetracarboxylic acid component constituting the polyimide may include:

pyromellitic dianhydride, biphenyltetracarboxylic dianhydride, naphthalenetetracarboxylic dianhydride, and cyclobutanetetracarboxylic dianhydride.

Examples of the diamine component may include bis[4-(aminophenoxy)phenyl] compounds represented by the following formula (I):

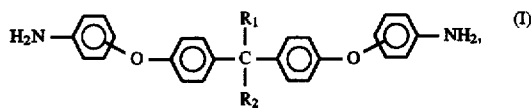

wherein $R_1$ and $R_2$ denote fluoroalkyl chain groups represented by $CF_3(CF_2)_m(CH_2)_L-$, ($L \geq 0$, $m \geq 0$) with the proviso that $R_1$ and $R_2$ may be the same or different.

The liquid crystal material used in the present invention may preferably be one showing a phase transition from isotropic phase through cholesteric phase and smectic A phase into chiral smectic C phase in the course of temperature decrease. Particularly, a chiral smectic liquid crystal showing a helical pitch of 0.8 micron or longer in cholesteric phase (measured at a mid temperature in the cholesteric range). Preferred examples of such a liquid crystal material may include liquid crystal materials (1)-(5) below comprising the following liquid crystals "LC-1", "80B" and "80SI*" in the indicated proportions by weight.

LC-1

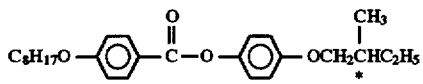

80B

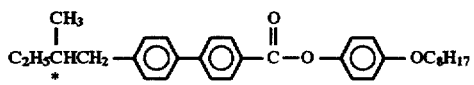

80SI*

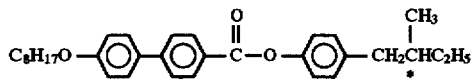

Liquid crystal material (1) (LC-1)$_{90}$/(80B)$_{10}$
(2) (LC-1)$_{80}$/(80B)$_{20}$
(3) (LC-1)$_{70}$/(80B)$_{30}$
(4) (LC-1)$_{60}$/(80B)$_{40}$
(5) (80SI*)$_{100}$ Hereinbelow, the present invention will be described with respect to some specific examples.

EXAMPLE 1

Figure 7:
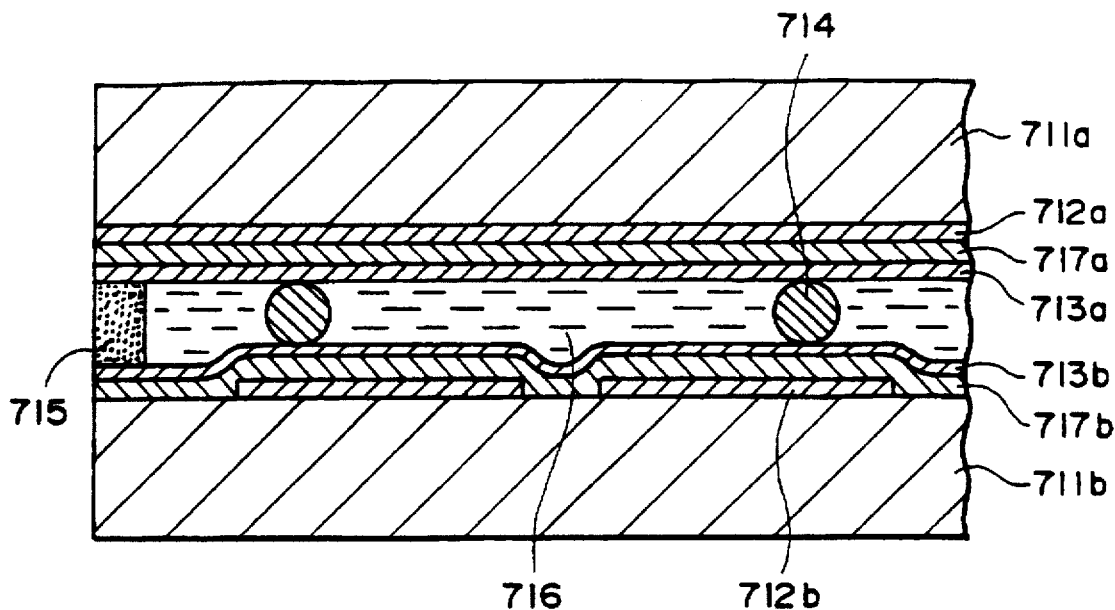

FIG. 7 is a schematic sectional view of a first embodiment of the liquid crystal cell according to the present invention.

Referring to FIG. 7, the liquid crystal cell includes a pair of an upper substrate 711a and a lower substrate 711b disposed in parallel with each other and provided with, e.g., about 400 to 2000 Å-thick transparent electrodes 712a and 712b. Between the upper substrate 711a and the lower substrate 711b is disposed a ferroelectric liquid crystal 716, preferably a ferroelectric smectic liquid crystal disposed in a non-helical structure providing at least two stable states.

On the transparent electrodes 712a and 712b, e.g., 100 to 2000 Å-thick insulating films 717a and 717b, respectively, are disposed. In a specific example, the insulating films 717a and 717b were respectively formed in a thickness of 1000 Å by applying a mixture solution of an organic titanium compound and an organic silicon compound by printing and baking the resultant film at 300° C. for 1 hour. On the insulating films 717a and 717b are further disposed, e.g., 150 to 4000 Å-thick alignment control films 713a and 713b, respectively. In a specific example, an alignment film-forming solution was prepared by dissolving a polyimide precursor ("LQ1802" (trade name) mfd. by Hitachi Kasei K. K.) in a mixture solvent of n-butyl carbitol and NMP (N-methylpyrrolidone) at a concentration of 3.8 wt. %. The solution contained 34 wt. % of the n-butyl carbitol. The solution was applied by printing onto the above insulating films 717a and 717b, left standing for 30 min. in an environment of 22° C. and 48% RH and baked at 270° C. for 1 hour to form 200 Å-thick alignment control films 713a and 713b, which were then respectively rubbed in one direction. Then, on one of the substrates, silica beads 714 with an average diameter of 1.5 μm were dispersed, and the other substrate was applied so that the rubbing directions provided to the pair of substrates were parallel and the same, thereby to form a cell, which was then filled with a ferroelectric liquid crystal to form a liquid crystal device. The device was then subjected to continual application of pulses to evaluate a cell thickness change before and after the pulse application.

The ferroelectric liquid crystal used in the test in this example (and also in other examples unless noted specifically) was a pyrimidine-based mixture liquid crystal showing the following phase transition series.

tilt angle Ⓗ =14 degrees
layer inclination angle δ=11 degrees
apparent tilt angle θ$_a$=11 degrees.

The alignment control film formed in the cell provided a pretilt angle a of 17 degrees. Thus, the cell formed in this example satisfied the relationships (1) and (2), and the above-mentioned C1 uniform alignment was developed stably.

Then, the entire cell was brought to an orientation state providing the average molecular axis direction 21 in FIG. 1A and then subjected to application for 7 hours of rectangular wave signals having a pulse width (Δt) of 25 μsec, a voltage amplitude Vpp of 40 volts and a duty ratio of ½. Thereafter, the cell thickness in the region 23 in FIG. 1B was measured and found to show only an increase of about 10% with respect to the initial value.

For comparison, a control device was prepared in the same manner as the above Example 1 except that the alignment film-forming solution was left standing for only 20 min. after the printing and subjected to measurement of a cell thickness in the region 23 in FIG. 1B was measured. The increase was about 30% with respect to the initial value.

Figure 8:
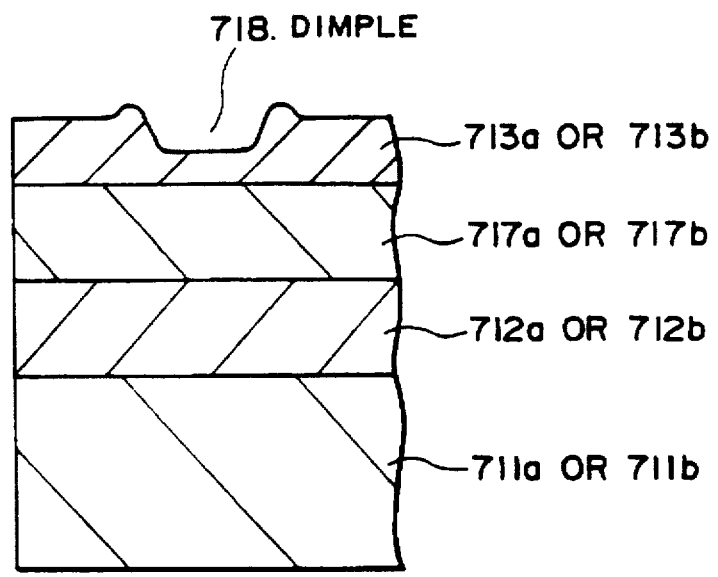
FIG. 8 is a schematic illustration of a dimple used in the invention.

Separately, the surface of the alignment film formed in the above Example was observed through a microscope, whereby dimples like one denoted by numeral 718 in FIG. 8 were observed in a diameter of 0.3–0.4 μm and at a density of about 0.5/μm².

In contrast thereto, in the alignment film formed in the comparative Example, dimples of a similar shape were observed but they had a diameter of 0.1–0.2 μm and were present at a density of about 0.4/μm².

In the above Example 1, it is accordingly understood that the dimples 718 were caused to have an increased diameter by 30 min. of standing, thereby reducing the liquid crystal movement and suppressing the cell thickness change. In this example, no direct surface treatment is involved in formation of the unevenness in the alignment film, it is accordingly possible to retain a stable alignment.

EXAMPLE 2

In this example, a liquid crystal cell was prepared in the same manner as in Example 1 except that the alignment film was left standing for 60 min. after the printing. The thus formed device was evaluated in the same manner as in Example 1, whereby the cell thickness increase in the region 23 was about 5% compared with the initial value As a result of observation, the alignment film showed surface dimples in a diameter of 0.6–0.7 μm at a density of about 0.5/μm². The homogeneity of the alignment was on the same level as in Example 1 so that a stable alignment characteristic was observed also in this example.

In this way, by increasing the time for standing of the alignment film after the printing, the diameter of dimples formed is increased to increase the effect of suppressing the liquid crystal movement.

For comparison, a liquid crystal cell was prepared in the same manner as in Example 1 except that the alignment film was left standing only for 2min. The device was evaluated in the same manner as in Example 1, whereby the cell thickness increase was about 40% compared with the initial value. As a result of observation, the alignment film did not show dimples as shown in FIG. 8.

EXAMPLE 3

In this example, a liquid crystal cell was prepared in the same manner as in Example 1 except that the alignment film was left standing for 90 min. after the printing. The thus formed device was evaluated in the same manner as in Example 1, whereby the cell thickness increase in the region 23 was about 5% compared with the initial value.

As a result of observation, the alignment film showed surface dimples in a diameter of 0.7–0.8 μm at a density of about 0.5/μm². The homogeneity of the alignment was good on the same level as in Example 1.

EXAMPLE 4

A liquid crystal cell was prepared in the same manner as in Example 2 except that the alignment film-forming solution was prepared at a concentration of 5.5wt. %. The resultant alignment film showed a thickness of 300 Å. The device was evaluated in the same manner as in Example 1 whereby the cell thickness increase in the region 23 in FIG. 1B was about 3% compared with the initial value. The alignment film surface showed dimples having a diameter of 0.65–0.75 μm at a density of about 0.8/μm². The homogeneity of alignment was on the same order as in Example 1 and a good alignment characteristic was observed.

In this way, an increased thickness of the alignment film tends to increase the size and density of dimples, thus showing an increased effect of suppressing the liquid crystal movement.

EXAMPLE 5

Figure 9A:
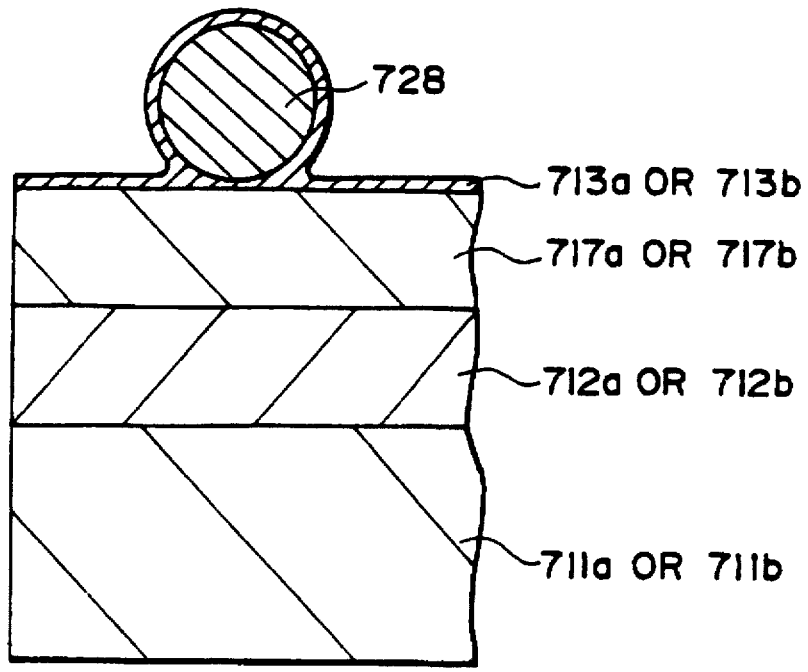
FIGS. 9A and 9B are schematic illustrations of an alignment control film respectively before and after removal of an $SiO_2$ bead.

An alignment film-forming solution was prepared by dissolving a polyimide precursor ("LQ1802", mfd. by Hitachi Kasei K. K.) at a concentration of 3.8 wt. % in N-methylpyrrolidone and, into 100 g of the solution, 5 g of 1.3 μm-dia. SiO₂ beads were uniformly dispersed. The dispersion liquid was applied by printing onto an insulating film formed in the same manner as in Example 1 and baked at 270° C. for 1 hour to form a 200 Å-thick alignment control film. FIG. 9A schematically shows an SiO₂ bead 728 disposed on the substrate. A pair of the thus formed alignment control films 717a and 717b formed on a pair of substrates 711a and 711b were rubbed in one direction. As a result, the SiO₂ beads fixed only by a thin alignment film 713a (or 713b) were easily removed by the rubbing with cloth. The trace 718 after removal of the SiO₂ bead 728 is shown in FIG. 9A. The traces (dimples) 718 were thus formed in a diameter of about 0.6 μm at a density of about 0.1/μm². Then, the substrates were subjected to ultrasonic washing within isopropyl alcohol to completely remove the SiO₂ beads 728 and remove dust generated by the rubbing. Then, on one of the substrates thus treated, SiO₂ beads 714 having an average diameter of 1.5 μm for retaining a cell gap were dispersed, and the other substrate was applied so that their rubbing directions were parallel and in the same direction to form a cell, which was then filled with the same ferroelectric liquid crystal as in Example 1 to form a liquid crystal device (cell).

The liquid crystal device was then subjected to evaluation of a cell thickness increase in the region 23 in FIG. 1B after AC application in the same manner as in Example 1, whereby the cell thickness increase was about 10% compared with the initial thickness.

For comparison, a liquid crystal cell was prepared in the same manner as in Example 5 above except that SiO₂ beads 728 were not dispersed in the alignment film-forming liquid, whereby the cell showed a cell thickness increase of about 30% in the region 23 in FIG. 1B with respect to the initial thickness.

EXAMPLE 6

A liquid crystal cell was prepared in the same manner as in Example 5 except that the alignment film-forming dispersion was prepared by dispersing 15 g of the SiO₂ beads 728 into 100 g of the alignment film-forming solution. The liquid crystal cell showed a cell thickness increase of about 8% in the region 23 in FIG. 1B with respect to the initial thickness. The alignment control film formed showed dimples of about 0.6 μm in diameter at a density of about 0.3/μm².

EXAMPLE 7

A liquid crystal cell was prepared in the same manner as in Example 5 except that the alignment film-forming dispersion was prepared by dispersing SiO₂ beads 728 having a diameter of 1.5 μm. The liquid crystal cell showed a cell thickness increase of about 9% in the region 23 in FIG. 1B with respect to the initial thickness. The alignment control film formed showed dimples of about 0.8 μm in diameter at a density of about 0.1/μm².

EXAMPLE 8

A liquid crystal cell was prepared in the same manner as in Example 6 except that the alignment film-forming dispersion was prepared by dispersing SiO$_2$ beads 728 having a diameter of 1.5 μm. The liquid crystal cell showed a cell thickness increase of about 7% in the region 23 in FIG. 1B with respect to the initial thickness. The alignment control film formed showed dimples of about 0.8 μm in diameter at a density of about 0.3/μm$^2$.

EXAMPLE 9

Figure 10:
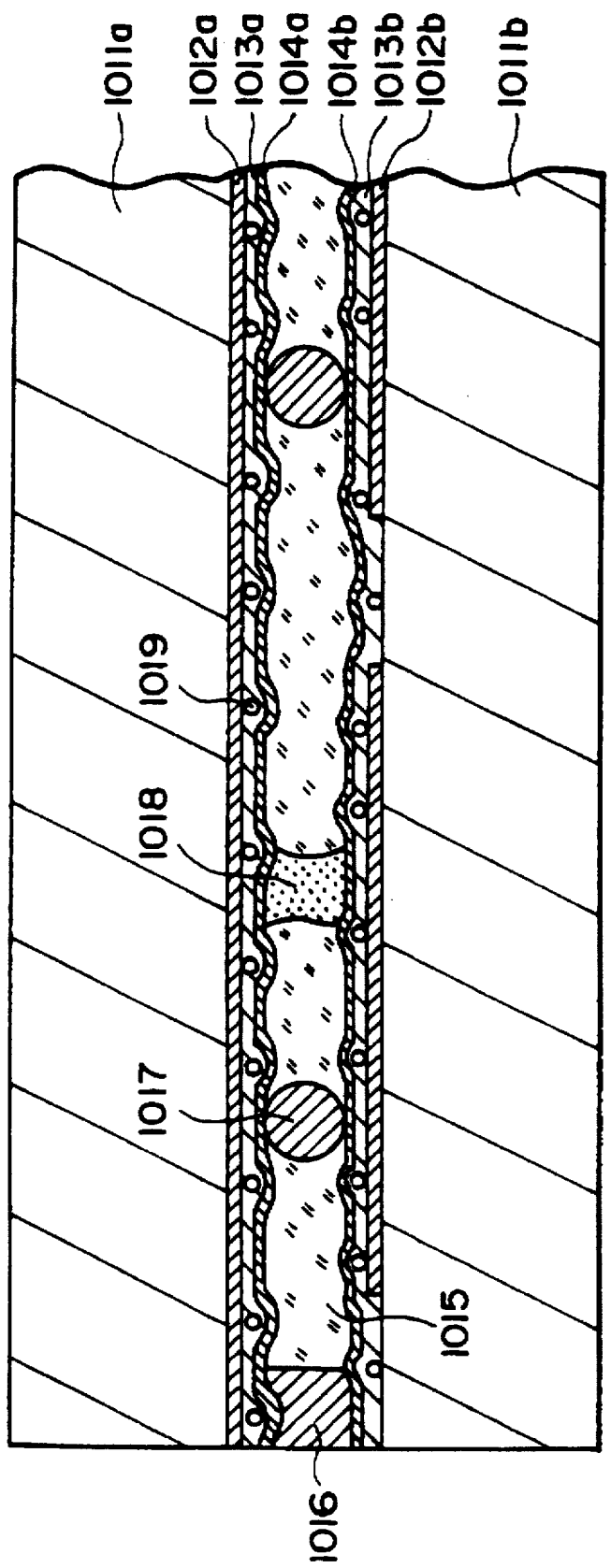

FIG. 10 is a schematic sectional view of another embodiment of the liquid crystal cell according to the present invention.

Referring to FIG. 10, the liquid crystal cell includes a pair of an upper substrate 1011a and a lower substrate 1011b disposed in parallel with each other and provided with, e.g., about 400 to 3000 Å-thick transparent electrodes 1012a and 1012b. Between the upper substrate 1011a and the lower substrate 1011b is disposed a ferroelectric liquid crystal 1015, preferably a ferroelectric smectic liquid crystal disposed in a non-helical structure providing at least two stable states.

On the transparent electrodes 1012a and 1012b, e.g., 100 to 3000 Å-thick insulating films 1013a and 1013b, respectively, are disposed. On the insulating films 1013a and 1013b are further disposed, e.g., 50 to 1000 Å-thick alignment control films 1014a and 1014b, respectively. The alignment control films may generally comprise a polymer but may preferably be one providing a high pretilt angle, e.g., one comprising a fluorine-containing polyimide.

In this specific example, the liquid crystal cell was prepared by forming transparent ITO electrodes 1012a and 1012b on glass substrates 1011a and 1011b and further thereon insulating films at wet application-baking type, which were formed by disposing 2000 Å-dia. silica beads (available from Ube Nitto Kasei K. K.) in a mixture solution of an organic titanium compound and an organic silicon compound to form a coating liquid and applying the coating liquid onto the transparent electrodes by Angstromer in a thickness of 1000 Å, followed by baking at 300° C. Incidentally, it is also possible to dispose a tantalum oxide by sputtering below the above insulating film to provide a two-layer structure. Thereon, a 1%-NMP solution of a polyimide precursor ("LQ-1802", mfd. by Hitachi Kasei K. K.) was applied by a spinner and baked at 270° C. for 1 hour, followed by rubbing. Two substrates treated in this way were applied to each other with a 1.5 μm gap held therebetween so that their rubbing directions were parallel and in the same direction, to form a cell. The cell was then filled with the same pyrimidinebased liquid crystal as used in Example 1 to obtain C1 alignment as described above.

Then, the entire cell was brought to an orientation state providing the average molecular axis direction 21 in FIG. 1A and then subjected to application for 7 hours of rectangular wave signals having a pulse width (Δt) of 25 μsec, a voltage amplitude Vpp of 40 volts and a duty ratio of ½. Thereafter, the cell thickness in the region 23 in FIG. 1B was measured and found to show only an increase of about 10% with respect to the initial value.

EXAMPLE 10

A liquid crystal cell was prepared in the same manner as in Example 7 except that 5000 Å-dia. particles ("Microgel, mfd. by Nippon Paint K. K.) were used for preparing the insulating films, and subjected to the same evaluation, whereby the cell thickness increase was only about 5% with respect to the initial thickness.

COMPARATIVE EXAMPLE

For comparison with Examples 9 and 10, a liquid crystal cell was prepared in the same manner except that no fine particles were mixed in preparation of the insulating films, and subjected to the same evaluation, whereby the cell thickness increase in the region 23 of FIG. 1B was about 30% with respect to the initial thickness.

EXAMPLE 11

A liquid crystal cell was prepared in a process as illustrated in FIG. 11A through FIG. 11E.

Figure 11A:
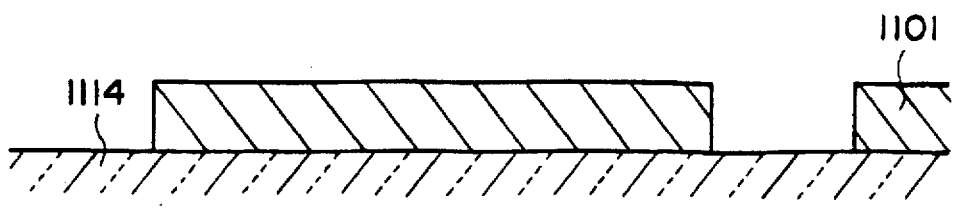
FIGS. 11A–11E are schematic sectional views for illustrating an insulating layer forming process according to an embodiment of the invention.
Figure 11B:
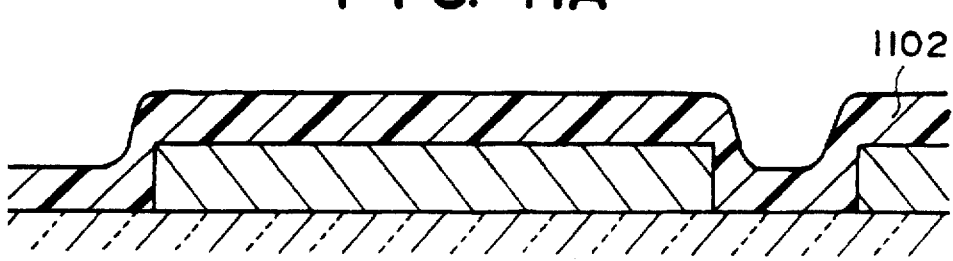

As shown in FIG. 11A, ITO transparent electrodes 1101 were formed on a substrate 1114 and then coated with a 600 Å-thick first insulating film 1102 of tantalum oxide (TaO$_x$) (FIG. 11B).

Figure 11C:
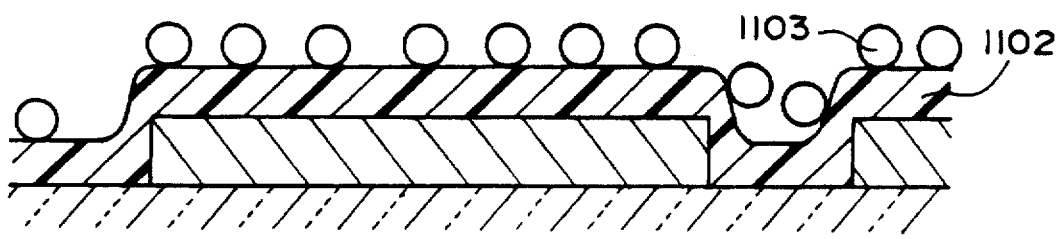

Then, true spherical beads 1103 of SiO$_2$ were dispersed on the first insulating film 1102 at a density of 2×10$^6$/mm$^2$ (FIG. 11C).

Figure 11D:
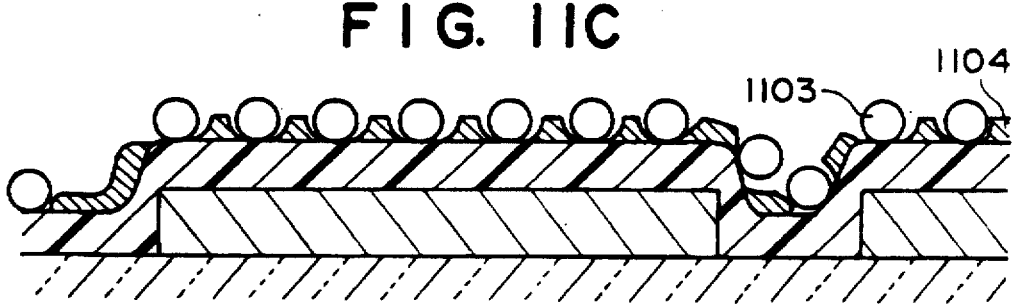

Then, a 600 Å-thick second insulating film 1104 of tantalum oxide (TaO$_x$) was formed thereon by vapor deposition (sputtering) (FIG. 11D).

Figure 11E:
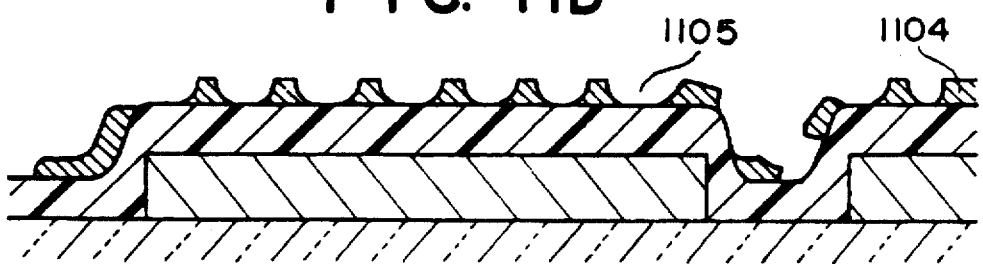

Then, the substrate was subjected to ultrasonic washing to completely remove the leads 1103, thus leaving dimples 1105 having a diameter of 2–3 μm and a depth of 600 Å (FIG. 11E).

Thereafter, an alignment film was formed thereon and subjected to rubbing.

Two substrates 1114 treated in the above-described manner were used to assemble a cell, which was then filled with a ferroelectric liquid crystal to provide a homogenous uniform alignment.

Then, the liquid crystal cell was driven for 500 hours by applying a drive voltage Vop of 20 volts as a durability test. As a result, no yellowing due to liquid crystal movement was observed even after 500 hours.

EXAMPLE 12

A liquid crystal cell was prepared in the same manner as in Example 1 except that the first insulating film 1102 was formed as an about 1000 Å-thick titanium-silicon mixture oxide film formed by printing and baking. The liquid crystal cell was subjected to the same durability drive test as in Example 11, whereby no yellowing due to liquid crystal movement was observed even after 500 hours of drive.

Incidentally, as a general feature of this embodiment, ordinarily true spherical inorganic fine particles with a diameter of at most 1 μm are dispersed and adsorbed at a rate of, e.g., 10$^4$–10$^7$/mm onto the first insulating film after the insulating film is formed by vacuum deposition or wet application in the first step. Then, a second insulating film of, e.g., at most about 1000 Å in thickness is formed by vacuum deposition. In this instance, due to the shadowing effect by the inorganic fine particles, dimples of several μm in diameter and at most 1000 Å in depth are formed. Thereafter, the attached inorganic fine particles are removed, e.g., by washing, and the resultant second insulating film provided with dimples is generally covered with an alignment film, wherein several hundred Å of unevenness is formed in the alignment film due to the dimples. The resultant unevenness has a function of hindering the monotonous continuity of SmC* layer generally formed when a ferroelectric liquid crystal is formed on an ordinary alignment film. This function can be exhibited within an extent of not impairing the homogeneity of alignment, and as a result of the function, the position of liquid crystal molecules acting as centers of moving torque are discontinuous in smectic layer extension, so that the velocity of the above-mentioned liquid crystal movement is remarkably reduced. Accordingly, in the device prepared through the above-mentioned process, the liquid crystal movement during drive is suppressed, and practically no problem is encountered in a long term of drive.

Incidentally, some inorganic particles can remain without adversely affecting the formation of normal cell gap to provide a liquid crystal panel.

EXAMPLE 13

A liquid crystal device as shown in FIG. 12 was prepared in the following manner.

Two 1.1 mm-thick glass plates each having a diagonal size of 5 inches and provided with 100 nm-thick ITO electrodes were provided. Each glass plate was further coated with a mixture solution of an organic titanium compound and an organic silicon compound (containing Ti:Si=1:1) (available from Tokyo Ohka Kogyo K. K.) and baked at 300° C. for 1 hour to form a 120 nm-thick insulating layer.

Figure 13:
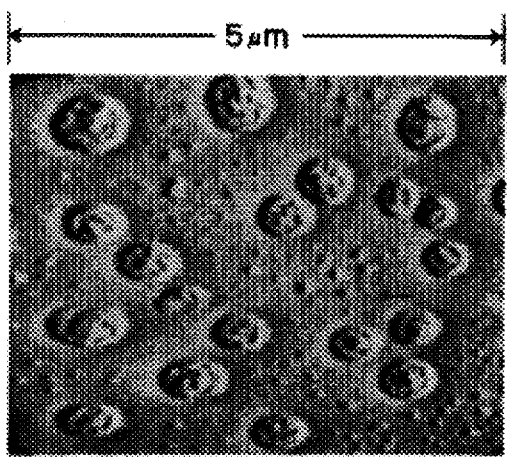
FIGS. 13 and 14 are STM (scanning-type tunnel microscope) pictures showing unevenness patterns formed on alignment control films according to Examples 13 and 14, respectively.

Then, a fluorine-containing polyamic acid was dissolved in a mixture solvent of NMP (N-methylpyrrolidon)/n-butyl cellosolve/n-butyl carbitol (=5/1/3) to form a 4% solution, which was applied by printing onto the insulating film and baked at 270° C. to form a 20 nm-thick fluorine-containing alignment control film. The surface of the alignment control film was rubbed in an ordinary manner, and the surface thereof was observed through an STM (scanning tunnel microscope, "SAM 3100", mfd. by Seiko Denshi K. K.) and was photographed to obtain a picture (FIG. 13). As is shown in FIG. 13, the alignment control film surface was provided with dimples having a diameter of 0.4–0.6 µm and a difference in height of 5–8 nm at a density of about $2 \times 10^6/mm^2$.

Two substrates thus treated were applied to each other with 1.2 µm-dia. silica beads disposed therebetween so that their rubbing directions were parallel, to prepare a blank cell. Then, the cell was filled with the pyrimidine-based mixture crystal used in Example 1 at 90° C. and gradually cooled to room temperature to form a liquid crystal cell.

As a result of measurement, the liquid crystal cell provided a tilt angle ⒽⒺ of 14 degrees, a layer inclination angle δ of 11 degrees, an apparent tilt angle θa of 11 degrees and a pretilt angle a given by the alignment control film of 17 degrees, thus showing C1 uniform alignment satisfying the above-mentioned relationships 1 and 2.

Then, the entire cell was brought to an orientation state providing the average molecular axis direction 21 in FIG. 1A and then subjected to application for 7 hours of rectangular wave signals having a pulse width (Δt) of 25 µsec, a voltage amplitude Vpp of 40 volts and a duty ratio of ½. Thereafter, the cell thickness in the region 23 in FIG. 1B was measured and found to show only an increase of about 6% with respect to the initial value.

Further, the cell was sandwiched between cross-nicol polarizers and observed by eyes with respect to its color, no coloring region due to a cell thickness increase was observed.

EXAMPLE 14

Figure 14:
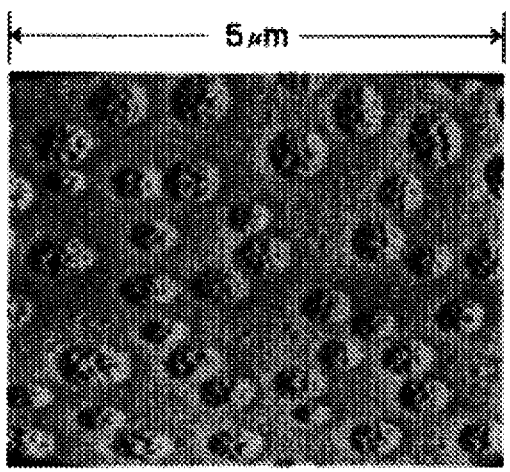

A coated substrate (electrode plate) provided up to a polyimide film was prepared in the same manner as in Example 13 except that the polyimide film was prepared by using a mixture solution of NMP/n-butyl cellosolve (=7/3) without adding the n-butyl carbitol. The resultant polyimide film surface showed no unevenness of dimples as a result of observation through a scanning electron microscope and an STM. Then, the polyimide film surface was subjected to blasting with fine particles of ice with an average diameter of about 30 µm. The polyimide film surface after the blasting was observed in the above-described manner, whereby the surface showed an unevenness including dimples having a maximum diameter of about 0.4 µm and a maximum depth of about 5 nm at a density of about $10^5/mm^2$ as shown in FIG. 14.

A liquid crystal cell was prepared by using two substrates treated as above otherwise in the same manner as in Example 13 and evaluated in the same manner as in Example 13, whereby an increase in cell side thickness of only 7% was caused. Further, as a result of observation of coloring by sandwiching the cell, no region of cell thickness increase was recognized.

EXAMPLE 15

A treated substrate was prepared in the same manner as in Example 14 up to formation of a polyimide film by using a mixture solvent of NMP/n-butyl cellosolve (=7/3). Then, a stamper having convexities of 2 µm in diameter at a density of $2 \times 10^4/mm^2$ was pressed against the polyimide film at a minute stroke to form dimple-shaped concavities similar to those shown in FIG. 14 and having a difference in height of about 8 nm in the polyimide film, which was then subjected to rubbing. A liquid crystal cell was prepared and evaluated in the same manner as in Example 14 except for using two electrode plates prepared in this manner.

The thickness increase on a cell side was only 6%. No cell thickness increase was observed as a result of observation of coloring with eyes by sandwiching the cell between cross-nicol polarizers.

COMPARATIVE EXAMPLE

Figure 15:
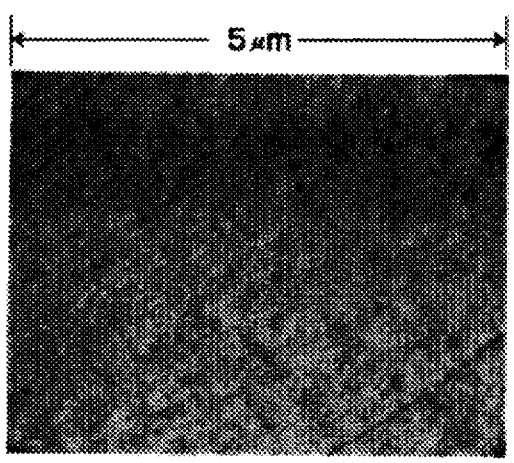
FIG. 15 is an STM picture showing the surface state of an alignment control film not provided with an unevenness pattern according to a Comparative Example.

For comparison with Examples 13–15, a comparative liquid crystal cell was prepared in the same manner as in Example 14 except for using a pair of electrode plates which were prepared by using a mixture solvent of NMP/n-butyl cellosolve (=7/3) to form an alignment control film identical to the one formed in Example 14 followed directly by rubbing without the intermediate blasting with fine particles of ice. The liquid crystal cell was evaluated in the same manner as in Example 14. As a result of the STM observation, the alignment control layer surface showed no unevenness (FIG. 15). As a result of AC application drive for 7 hours under the same conditions as in Example 13, the cell thickness increase was 40%. The cell was sandwiched between cross nicol polarizers and observed with respect to coloring with eyes, whereby the region showing the cell thickness increase caused a color change into yellow and a remarkable change in threshold values.

EXAMPLE 16

Two 1.1 mm-thick glass plates each provided with ITO transparent electrodes were respectively coated with a 120 nm-thick Ti/Si mixture oxide insulating layer in the same manner as in Example 13 and then coated by printing with a polyimide-forming liquid prepared by dissolving a polyimide precursor ("LQ 1802" (trade name), mfd. by Hitachi Kasei K. K.) in a mixture solvent of NMP/n-butylcarbitol to a resin concentration of 3.8 wt. % and an n-butyl carbitol concentration of 34 wt. %, followed by standing for 30 min. in an environment of 22° C. and 48%RH and baking at 270° C. for 1 hour, to form a 20 nm-thick alignment control film. The thus-prepared pairs of alignment control films (1214a and 1214b in FIG. 12) were rubbed so as to provide rubbing directions which were parallel and the same. The rubbed alignment control film surface showed dimples having a planar shape as shown in FIG. 13 (corresponding schematic sectional view is given in FIG. 8) and having a diameter of 0.3–0.4 µm at a density of about $5\times10^5$/mm² as a result of the STM observation.

Then, on one of the substrates, silica beads having an average diameter of 1.2 µm, and the other substrate was applied thereto to form a cell, which was then filled with the pyrimidine-based mixture ferroelectric liquid crystal used in Example 1 to form a liquid crystal cell. In the liquid crystal cell, a homogeneous C1 uniform alignment state similarly as in Example 1 was formed as a result of microscopic observation. Then, the cell was evaluated with respect to the cell thickness change after the pulse application in the same manner as in Example 13, whereby the cell thickness increase in the region 23 in FIG. 1B was suppressed to about 10% with respect to the initial thickness.

For comparison, a control device was prepared in the same manner as above except that the alignment control film-forming liquid was left standing for only 20 sec., and evaluated in the same manner. As a result, the resultant thickness in the region 23 of FIG. 1B was increased by about 30% compared with the initial value.

As a result of observation, the alignment control film surface showed dimples of a similar shape but they showed a density of 0.1–0.2 µm and were present at a density of about $4\times10^5$ /mm².

Further, for the purpose of comparison, another control liquid crystal device was prepared in the same manner except that the standing time of the alignment control film after the printing was further reduced to 2 min., and evaluated in the same manner as above. As a result, the cell thickness increase on a cell side amounted to about 40%. Further, the alignment control film after rubbing did not show dimples as shown in FIG. 14 (but the same level as shown in FIG. 15).

EXAMPLE 17

A liquid crystal cell was prepared in the same manner as in Example 16 except that the alignment control film after the printing was left standing for 60 min. The device was evaluated in the same manner as in Example 16, whereby the cell thickness increase in the region 23 of FIG. 1B was about 5%.

As a result of observation, the alignment control film after the rubbing showed surface dimples in a diameter of 0.6–0.7 µm at a density of about $5\times10^5$/mm². Further, the homogeneity of alignment was on the same level as in Example 16, and it was confirmed that a stable alignment characteristic was retained also in this Example.

In this way, by increasing the time for standing of the alignment control film after the printing, the diameter of dimples formed is increased to enhance the effect of suppressing the liquid crystal movement.

EXAMPLE 18

A liquid crystal cell was prepared in the same manner as in Example 16 except that the alignment control film after the printing was left standing for 90 min. The device was evaluated in the same manner as in Example 16, whereby the cell thickness increase in the region 23 of FIG. 1B was about 5%.

As a result of observation, the alignment control film after the rubbing showed surface dimples in a diameter of 0.7–0.8 µm at a density of about $5\times10^5$ /mm². Further, the homogeneity of alignment was on the same level as in Example 16.

EXAMPLE 19

A liquid crystal cell was prepared in the same manner as in Example 17 except that the alignment film-forming solution was prepared at a concentration of 5.5 wt. %. The resultant alignment film showed a thickness of 30 nm. The device was evaluated in the same manner as in Example 16 whereby the cell thickness increase in the region 23 in FIG. 1B was about 3% compared with the initial value. The alignment film surface showed dimples having a diameter of 0.65–0.75 µm at a density of about $8\times10^5$/mm². The homogeneity of alignment was on the same level as in EXAMPLE 16 and a good alignment characteristic was observed.

In this way, an increased thickness of the alignment film tends to increase the size and density of dimples, thus showing an increased effect of suppressing the liquid crystal movement.

EXAMPLE 20

Figure 9B:
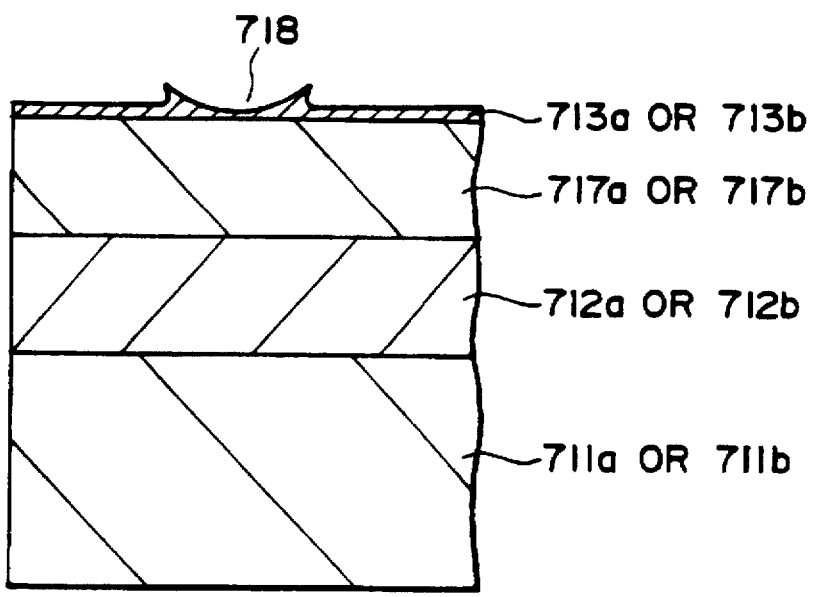

Two substrates were treated up to a provision of a 100 nm-thick Ti/Si mixture oxide insulating film in the same as in Example 16. Separately, an alignment film-forming solution was prepared by dissolving a polyimide precursor ("LQ1802", mfd. by Hitachi Kasei K. K.) in N-methylpyrrolidone to provide a resin concentration of 3.8 wt. % and, into 100 g of the solution, 5 g of 1.3 µm-dia. $SiO_2$ beads were uniformly dispersed. The dispersion liquid was applied by printing onto the insulating film and baked at 270° C. for 1 hour to form a 200 Å-thick alignment control film. FIG. 9A schematically shows an $SiO_2$ bead thus disposed on the substrate. A pair of the thus formed alignment control films formed on a pair of substrates were rubbed in one direction. As a result, the $SiO_2$ beads fixed only by a thin alignment film were easily removed by the rubbing with cloth. The trace 718 after removal of the $SiO_2$ bead 728 is shown in FIG. 9B. The traces (dimples) 718 were thus formed in a diameter of about 0.6 µm at a density of about $1\times10^5$/mm². Then, the substrates were subjected to ultrasonic washing within isopropyl alcohol to completely remove the $SiO_2$ beads and remove dust generated by the rubbing. Then, on one of the substrates thus treated, $SiO_2$ beads having an average diameter of 1.5 µm for retaining a cell gap were dispersed, and the other substrate was applied so that their rubbing directions were parallel and in the same direction to form a cell, which was then filled with the same ferroelectric liquid crystal as in Example 1 to form a liquid crystal device (cell).

The liquid crystal device was then subjected to evaluation of a sell thickness increase in the region 23 in FIG. 1B after AC application in the same manner as in Example 1, whereby the cell thickness increase was about 10% compared with the initial thickness.

For comparison, a liquid crystal cell was prepared in the same manner as in Example 20 above except that $SiO_2$ beads were not dispersed in the alignment film-forming liquid, whereby the cell showed a cell thickness increase of about 30% in the region 23 in FIG. 1B with respect to the initial thickness.

EXAMPLE 21

A liquid crystal cell was prepared in the same manner as in Example 20 except that the alignment film-forming dispersion was prepared by dispersing 15 g of the $SiO_2$ beads into 100 g of the alignment film-forming solution. The liquid crystal cell showed a cell thickness increase of about 8% in the region 23 in FIG. 1B with respect to the initial thickness. The alignment control film formed showed dimples of about 0.6 µm in diameter at a density of about $3\times10^5/mm^2$.

EXAMPLE 22

A liquid crystal cell was prepared in the same manner as in Example 20 except that the alignment film-forming dispersion was prepared by dispersing $SiO_2$ beads having a diameter of 1.5 µm. The liquid crystal cell showed a cell thickness increase of about 9% in the region 23 in FIG. 1B with respect to the initial thickness. The alignment control film formed showed dimples of about 0.8 µm in diameter at a density of about $1\times10^5/mm^2$.

EXAMPLE 23

A liquid crystal cell was prepared in the same manner as in Example 21 except that the alignment film-forming dispersion was prepared by dispersing $SiO_2$ beads having a diameter of 1.5 µm. The liquid crystal cell showed a cell thickness increase of about 7% in the region 23 in FIG. 1B with respect to the initial thickness. The alignment control film formed showed dimples of about 0.8 µm in diameter at a density of about $3\times10^5/mm^2$.

EXAMPLE 24

Figure 17:
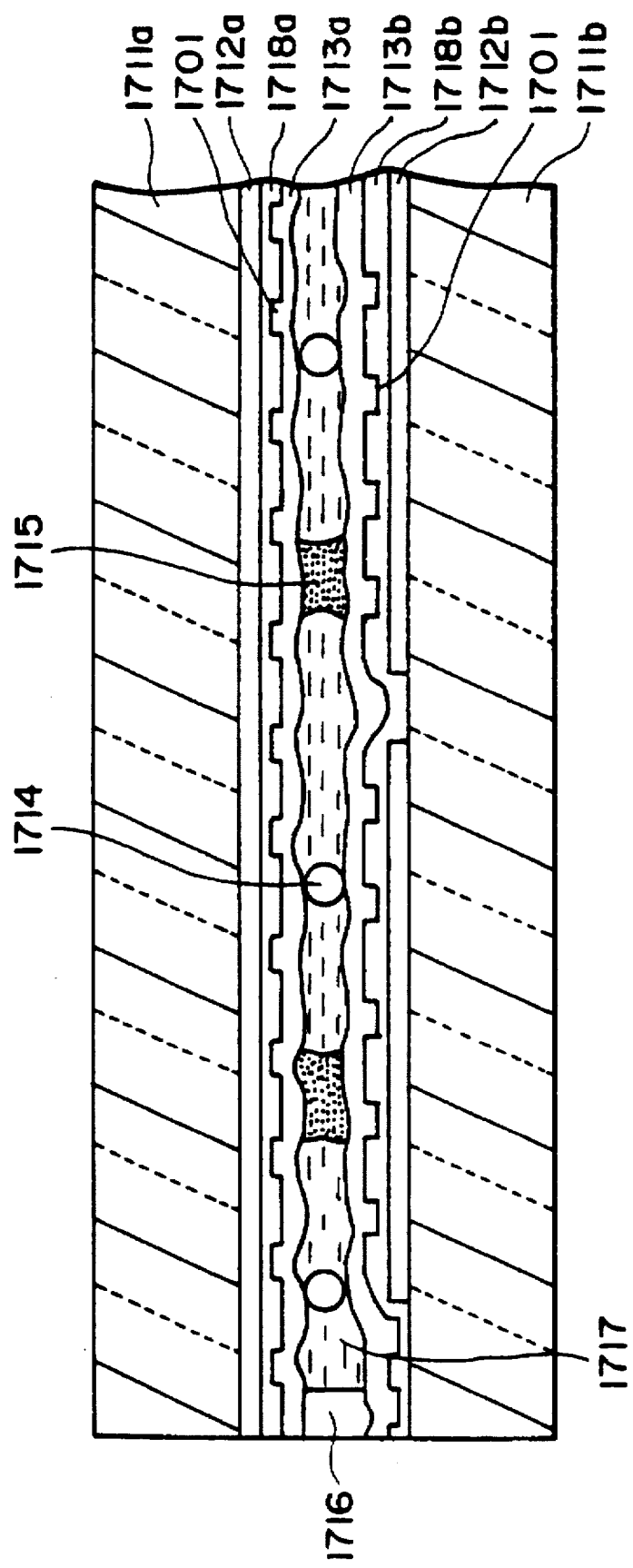

FIG. 17 is a schematic sectional view of another embodiment of the liquid crystal cell according to the present invention.

Referring to FIG. 17, the liquid crystal cell includes a pair of an upper substrate 1711a and a lower substrate 1711b disposed in parallel with each other and provided with, e.g., about 400 to 2000 Å-thick transparent electrodes 1712a and 1712b. Between the upper substrate 1711a and the lower substrate 1711b is disposed a ferroelectric liquid crystal 1717, preferably a ferroelectric smectic liquid crystal disposed in a non-helical structure providing at least two stable states. On the transparent electrodes 1712a and 1712b, e.g., 100 to 2000 Å-thick insulating films 1718a and 1718b, respectively, are disposed.

The insulating films 1718a and 1718b may preferably be formed by an insulating material of wet application-baking type. More specifically, it is possible to use a mixture solution of an organic titanium compound and an organic silicon compound. The mixture solution may be applied by printing as by Angstromer, etc., dried at about 150° C. and baked at 300° C. to form an insulating film.

Figure 16A:
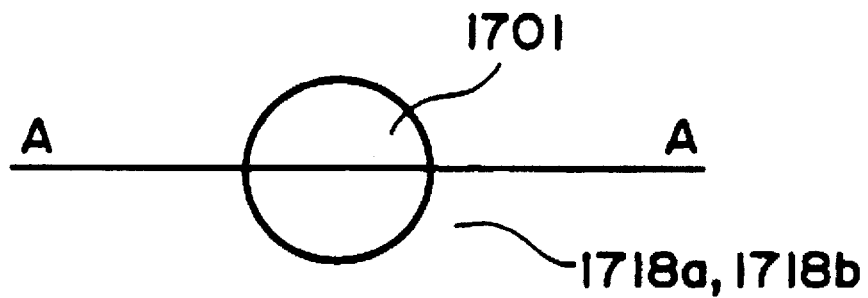
FIGS. 16A and 16B are schematic illustrations of a dimple formed according to the invention.
Figure 16B:
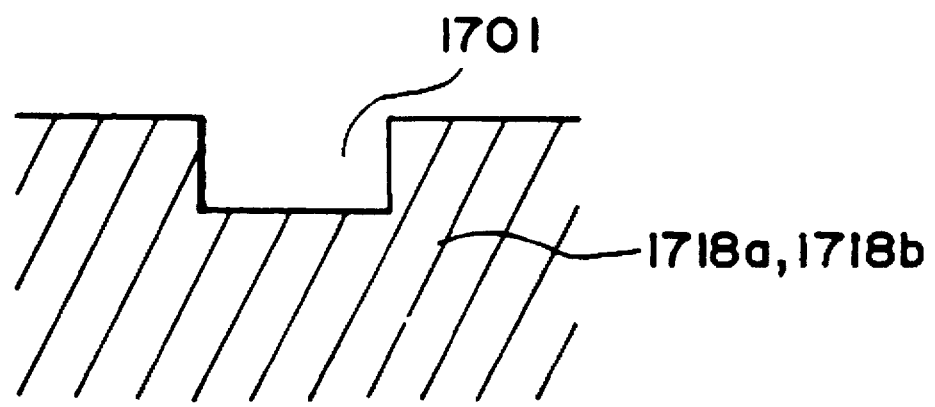

The insulating films 1718a and 1718b are provided with almost or rather shallow (semi-) cylindrical dimples or concavities 1701, of which the front view is schematically shown in FIG. 16A, and FIG. 16B is a corresponding sectional view taken along the line A—A in FIG. 16A. The dimples 1701 may be provided after drying and before baking of the insulating films 1718a and 1718b, e.g., by stamping. The dimples 1701 may have a diameter of, e.g., 0.1–1.0 µm and may be formed at a density of 0.1–10/µm². The depth D of the dimples may preferably be set within a range of da<D<100da with respect to the thickness da of alignment control films 1713a and 1713b formed on the insulating films, more specifically, e.g., within the range of 1 nm–50 nm. The dimples 1701 may have another shape of concavity or convexity other than a hollow-semicylinder as far as they can provide a similar size or degree of unevenness.

In order to enhance the insulating between the pair of substrates, it is possible to insert an additional inorganic oxide insulating film layer of, e.g., 200–3000 Å in thickness, e.g., by sputtering, between the insulating film 1718 (and/or 1718b) and the transparent electrode 1712a (and/or 1712b).

After the baking of the insulating films 1718a and 1718b, the alignment control films 1713a and 1713b may be formed thereon, e.g., as a 10 to 1000 Å-thick film of an organic polymer, such as a polyimide. The alignment control films 1713a and 1713b may be rubbed in directions which are almost parallel and in the same direction.

The spacing between the substrates may be held by, e.g., silica beads 1714 having an average particle size of about 1.5 µm (0.1–3.5 µm, in general) and a particulate adhesive 1715. The periphery of the cell is sealed by a sealant 1716.

In a specific example, a liquid crystal cell was prepared in the above-described manner. Then, the entire cell was brought to an orientation state providing the average molecular axis direction 21 in FIG. 1A and then subjected to application for 7 hours of rectangular wave signals having a pulse width ($\Delta t$) of 25 µsec, a voltage amplitude Vpp of 40 volts and a duty ratio of ½. Thereafter, the cell thickness (gap) in the region 23 in FIG. 1B was measured and found to show only an increase of about 10% with respect to the initial value.

For comparison, a control device was prepared in the same manner as the above Example 24 except that the dimples 1701 were not formed in the insulating film 1718a or 1718b, and subjected to measurement of a cell thickness in the region 23 in FIG. 1B. The increase was about 30% with respect to the initial value.

EXAMPLE 25

Figure 18:
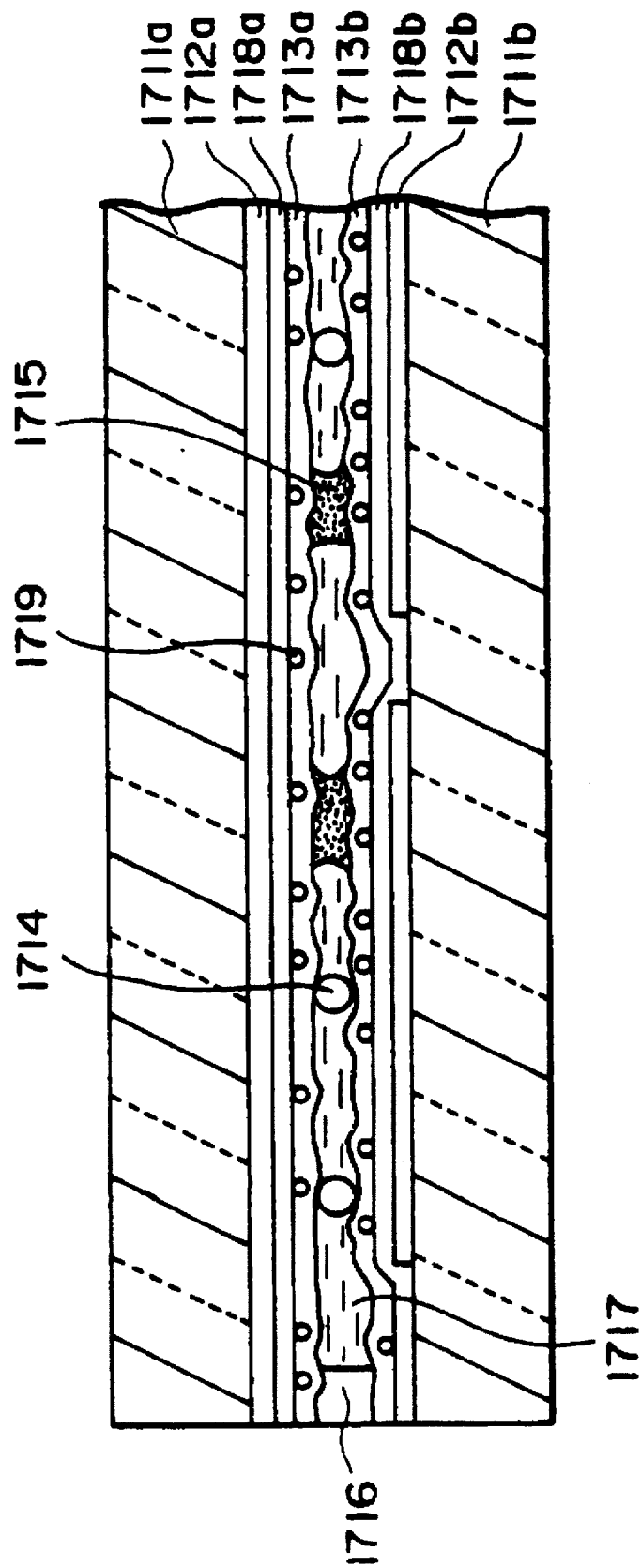

FIG. 18 is a schematic sectional view of another embodiment of the liquid crystal cell according to the present invention.

This embodiment is different from the embodiment of FIG. 17 in the fine particles 1719 are dispersed at the surface of the insulating films 1718a and 1718b instead of providing the insulating films with dimples.

The fine particles 1719 may comprise fine particles of inorganic materials, such as silica and titania, or organic materials, such as acrylic resins and polystyrene. The fine particles 1719 may preferably have an average diameter Dp satisfying da<Dp<100da with respect to the thickness da of alignment control films 1713a and 1713b formed on the insulating films, more specifically in the range of 50 nm≦Dp ≦5000 nm with respect to the alignment control film thickness da in the range of 10 nm ≦da≦100 nm. The fine particles 1719 may preferably be dispersed at a density of 0.1–10 pieces/µm², more preferably 0.5–5 pieces/µm².

The other structure and production process are similar to the embodiment of FIG. 17.

A specific cell prepared according to this embodiment was evaluated in the same manner as in Example 24, whereby a similar level of liquid crystal movement-suppressing effect was observed.

EXAMPLE 26

FIG. 19 is a schematic sectional view of another embodiment of the liquid crystal cell according to the present invention.

Referring to FIG. 19, the liquid crystal cell includes a pair of an upper substrate 1911a and a lower substrate 1911b disposed in parallel with each other and provided with, e.g., about 400 to 3000 Å-thick transparent electrodes 1912a and 1912b. Between the upper substrate 1911a and the lower substrate 1911b is disposed a ferroelectric liquid crystal 1916, preferably a ferroelectric smectic liquid crystal disposed in a non-helical structure providing at least two stable states.

On the transparent electrodes 1912a and 1912b, e.g., 100 to 3000 Å-thick insulating films 1913a and 1913b, respectively, are disposed. In this embodiment, each of the insulating films 1913a and 1913b may comprise at least one layer of an insulating film of wet application-baking type and can have a composite or laminate structure further including an insulating film of vacuum deposition type as by sputtering. On the insulating films 1913a and 1913b are disposed alignment control films 1914a and 1914b, respectively, of, e.g., 50–1000 Å in thickness.

In a specific example according to this embodiment, two 1.1 mm-thick glass plates each provided with about 1000 Å-thick ITO electrodes 1912a (or 1912b) were respectively coated with a mixture of a wet application-type insulating film-forming liquid (Ti:Si=1:1) (available from Tokyo Ohka K. K.), tripropylene glycol monomethyl ether and ethyl carbitol acetate in mixing ratios of 2:1:1 by spin coating at 1500 rpm for 20 sec., followed by pre-drying for 3 min. at 100° C. and baking at 300° C. for 60 min., to form about 1000 Å-thick insulating films 1913a and 1913b. As a result of observation through an STM (scanning-type tunnel microscope), the insulating film surface showed an unevenness including dimples (concavities) or dots (convexities) providing a difference in height of 400–800 Å and a width or diameter of 0.5–1.0 μm at a density of about $2 \times 10^6/\text{mm}^2$.

Then, each insulating film was further coated with a 1%-NMP solution of a polyamide acid ("LQ 1802", mfd. by Hitachi Kasei K. K.) by a spinner, followed by baking at 270° C. for 1 hour to form a 200 Å-thick polyimide alignment film, which was then rubbed with a nylon-planted cloth in one direction.

Two substrates thus treated were applied to each other with 1.2 μm-dia. silica beads dispersed therebetween so that their rubbing directions were parallel and in the same direction to form a cell, which was then filled at 100° C. with the same pyrimidine-based mixture ferroelectric liquid crystal as used in Example 1 to form a liquid crystal cell. In the liquid crystal cell C1 uniform alignment was developed.

Then, the entire cell was brought to an orientation state providing the average molecular axis direction 21 in FIG. 1A and then subjected to application for 12 hours of rectangular wave signals having a pulse width (Δt) of 25 μsec, a voltage amplitude Vpp of 40 volts and a duty ratio of ½. Thereafter, the cell thickness in the region 23 in FIG. 1B was measured and found to show only an increase of about 10% with respect to the initial value.

Further, the cell was sandwiched between cross-nicol polarizers and observed by eyes with respect to its color, no coloring region due to a cell thickness increase was observed.

EXAMPLE 27

Two 1.1 mm-thick glass plates each provided with about 1000 Å-thick ITO electrodes were respectively coated with a mixture of a wet application-type insulating film-forming liquid "Ceramate CRL", available from Shokubai Kasei K. K.), γ-butyrolacetone and tripropylene glycol monomethyl ether in mixing ratios of 7:1:2 by spin coating at 1500 rpm for 20 sec., followed by pre-drying for 3 min. at 100° C. and baking at 300° C. for 60 min., to form about 2000 Å-thick insulating films. As a result of observation through an STM (scanning-type tunnel microscope), the insulating film surface showed an unevenness including dimples (concavities) or dots (convexities) providing a difference in height of 1000–1500 Å and a width or diameter of 1.0–2.0 μm at a density of about $1 \times 10^6/\text{mm}^2$.

Then, each insulating film was further coated with a 1%-NMP solution of a polyamide acid ("LQ 1802", mfd. by Hitachi Kasei K. K.) by a spinner, followed by baking at 270° C. for 1 hour to form a 200 Å-thick polyimide alignment film, which was then rubbed with a nylon-planted cloth in one direction.

Two substrates thus treated were applied to each other with 1.2 μm-dia. silica beads dispersed therebetween so that their rubbing directions were parallel and in the same direction to form a cell, which was then filled at 100° C. with the same pyrimidine-based mixture ferroelectric liquid crystal as used in Example 1 to form a liquid crystal cell. In the liquid crystal cell C1 uniform alignment was developed.

Then, the entire cell was brought to an orientation state providing the average molecular axis direction 21 in FIG. 1A and then subjected to application for 12 hours of rectangular wave signals having a pulse width (Δt) of 25 μsec, a voltage amplitude Vpp of 40 volts and a duty ratio of ½. Thereafter, the cell thickness in the region 23 in FIG. 1B was measured and found to show only an increase of about 5% with respect to the initial value.

Further, the cell was sandwiched between cross-nicol polarizers and observed by eyes with respect to its color, no coloring region due to a cell thickness increase was observed.

COMPARATIVE EXAMPLE

Two 1.1 mm-thick glass plates each provided with about 1000 Å-thick ITO electrodes were respectively coated with a wet application-type insulating film-forming liquid (Ti:Si= 1/1) (available from Tokyo Ohka.K. K.), by spin coating at 1500 rpm for 20 sec., followed by pre-drying for 3 min. at 100° C. and baking at 300° C. for 60 min., to form about 1500 Å-thick insulating films. As a result of observation through an STM (scanning-type tunnel microscope), the insulating film surface showed a irregular unevenness of about 50 Å.

Then, each insulating film was further coated with a 1%-NMP solution of a polyamide acid ("LQ 1802", mfd. by Hitachi Kasei K. K.) by a spinner, followed by baking at 270° C. for 1 hour to form a 200 Å-thick polyimide alignment film, which was then rubbed with a nylon-planted cloth in one direction.

A liquid crystal cell was prepared by using the two substrates thus treated and thereafter following the procedure of Example 26, and evaluated with respect to the cell thickness increase in the same manner as in Example 26. As a result, the cell thickness increase in the region 23 of FIG. 1B amounted to about 50% with respect to the initial thickness.

The cell was sandwiched between cross nicol polarizers and observed with respect to coloring with eyes, whereby the region showing the cell thickness increase caused a color change into yellow.

EXAMPLE 28

Figure 21:
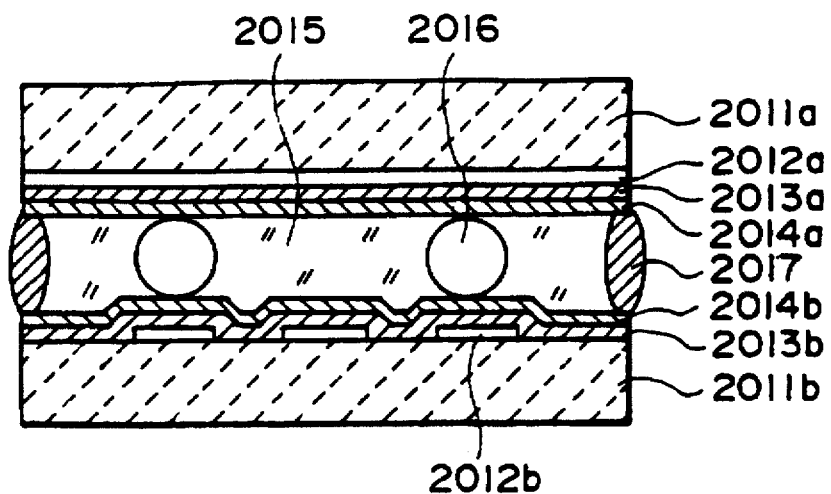

FIG. 20 is a front view of another embodiment of the liquid crystal device (cell) according to the present invention and FIG. 21 is a corresponding sectional view.

Referring to FIGS. 20 and 21, the liquid crystal device has a cell structure including a pair of 1.1 mm-thick glass substrates 2011a and 2011b disposed opposite to each other and with a spacing therebetween of 0.1–3 μm held by spacer beads 2016 of silica, alumina, etc., and also a sealing adhesive 2017 bonding the substrates to each other. On the substrate 2011 are disposed a plurality of stripe transparent electrodes 2012a (e.g., used as a group of electrodes for applying a scanning signal among the matrix electrodes). On the substrate 2011b are disposed a plurality of stripe transparent electrodes (e.g., used as a group of electrodes for applying data signals among the matrix electrodes) so as to intersect the transparent electrodes 2012a. The transparent electrodes 2012a and 2012b disposed on the substrates 2011a and 2011b, respectively, are further coated with short circuit-preventing insulating films 2013a and 2013b, respectively, and then with alignment control films 2014a and 2014b. Between the substrates 2011a and 2011b is disposed a ferroelectric smectic liquid crystal 2015.

The transparent electrodes 2012a and 2012b may comprise, e.g., $In_2O_3$ or ITO and have a thickness on the order of 1500 Å.

The short circuit-preventing insulating films 2013a and 2013b may have a thickness in the range of 200–3000 Å and may be formed as a film of an inorganic insulating substance, such as $SiO_2$, $TiO_2$ or $Ta_2O_5$, e.g., by sputtering. Alternatively, the insulating films 2013a and 2013b may be formed as an inorganic insulating film by applying a solution of an organic metal compound containing at least one of metals, such as Si, Ti, Ta, Zr and Al, followed by baking.

The inorganic insulating films for the insulating films 2013a and 2013b, after the formation, are rubbed in one direction to provide the insulating films with a surface unevenness. This is a principal characteristic of this embodiment. The rubbing materials may comprise glass wool, steel wool or a rubbing cloth comprising a pile yarn of nylon, acetate or polyester. Among these, hard rubbing materials, such as glass wool or steel wool may be preferred in order to provide a sufficient effect.

The alignment control films 2014a and 2014b may have a thickness of 50–1000 Å, preferably 200 Å or below, and may comprise a film of an organic insulating substance, such as polyvinyl alcohol, polyimide, polyamideimide, polyesterimide, polyparaxylylene, polyester, polycarbonate, polyvinyl acetal, polyvinyl chloride, polyamide, polystyrene, cellulose resin, melamine resin, urea resin or acrylic resin.

The alignment control films 2014a and 2014b may be formed by rubbing the surface of a film of such an organic insulating substance in one direction to be provided with a uniaxial alignment axis in substantially the same direction as the rubbing direction.

In a specific example, several pair of 1.1 mm-thick glass substrates were respectively provided with ITO stripe electrodes and covered with a 1000 Å-thick insulating film of SiO for preventing short circuit between the substrates by sputtering. Then, the respective pairs of insulating films were rubbed by a hard material of glass wool or steel wool, or a soft material of a rubbing cloth comprising pile yarn of nylon, acetate or polyester, or none (as control). The respective pairs of insulating films were then coated with a polyimide-forming solution ("LQ 1802", mfd. by Hitachi Kasei K. K.) by a spinner, followed by heating, to form polyimide alignment films having a thickness of at most 200 Å.

Then, each pair of substrates were subjected to rubbing onto the polyimide films with a nylon rubbing cloth. Then, silica beads with an average diameter of about 1.5 μm were disposed on one substrate, an epoxy resin adhesive was applied onto the other substrate by screen printing, and the pair of substrates were applied to each other so that their electrodes crossed each other to form a cell (panel), which was then filled with the pyrimidine-based ferroelectric liquid crystal used in Example 1 through an injection port and gradually cooled to a chiral smectic phase temperature to align the ferroelectric liquid crystal.

In this way, several liquid crystal cells were prepared. For each cell, the entire cell was brought to one optically stable orientation state and then subjected to application for about 16 hours of rectangular pulses having a pulse width of 25 μsec, a voltage amplitude of 40 volts and a duty ratio of ½. Then, the local cell thickness was measured along the cell sides.

The maximum cell thickness increases for the respective cells (Examples and comparative Examples) are listed in the following Table 2.

TABLE 2

| Example | 28-1 | 28-2 | 28-3 | 28-4 | 28-5 | Comparative |
|---|---|---|---|---|---|---|
| Rubbing material* | glass wool | Steel wool | nylon cloth | acetate cloth | polyester cloth | none |
| Maximum thickness increase | +16% | +10% | +24% | +26% | +25% | +35% |

*used for rubbing the insulating film

From the above results, it is understood that the liquid crystal movement was suppressed by rubbing the insulating films, and a deeper thickness given by a harder rubbing material showed a larger effect of suppressing the liquid crystal movement.

EXAMPLE 29

A polyamide acid including a structure (A) and a structure (B) shown below in a mol ratio of (A):(B)=1:1 was dissolved in a solvent mixture of N-methyl-2-pyrrolidone/n-butyl cellosolve/n-butyl carbitol=3.0/1.0/2.2 (wt. ratio) which had been found to be optimum for providing a desired surface unevenness to provide a 3.0 wt. % polyamic acid solution.

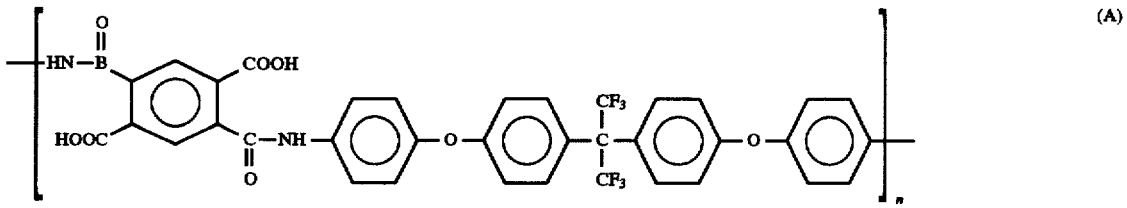

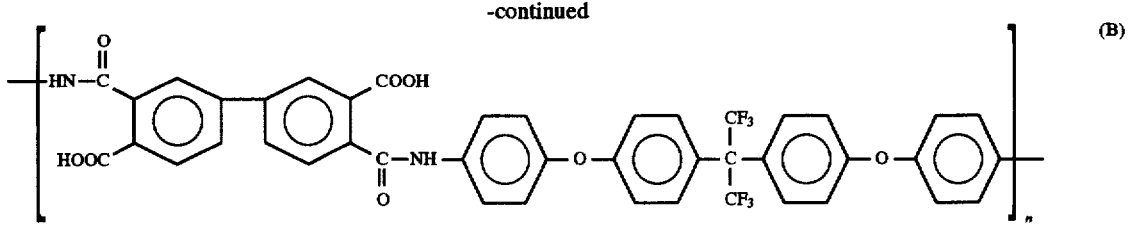

Two 1.1 mm-thick glass plates each provided with about 1000 Å-thick ITO electrodes were respectively coated with the above-prepared polyamic acid solution by spin coating, followed by baking for about 1 hour under heating at 250° C. to form a 200 Å-thick alignment film.

Then, each alignment film was rubbed with a nylon-plated cloth in one direction. The carbon atomic ratios with other atoms were measured by XPS (X-ray photoelectron spectroscopy) with respect to the alignment film before and after the rubbing. The results are shown in the following Table 3. As shown, there was observed a characteristic tendency that the carbon atomic ratios were generally higher than the theoretical values derived from the chemical structure. The alignment film surface also showed minute dimples having a diameter of around 5000 Å and providing a difference in height of around 50 Å as a result of observation through a SEM (scanning electron microscope).

TABLE 3

|  | Before rubbing | | | After rubbing | | |  |
|---|---|---|---|---|---|---|---|
|  | C/F | C/O | C/N | C/F | C/O | C/N |  |
| Theoretical value | 6.67 | 6.67 | 20.0 | 6.67 | 6.67 | 20.0 |  |
| Measured value Incidence angle = 15° | 6.54 | 9.80 | 31.3 | 7.58 | 10.87 | 27.0 | To the surface |
| Measured value Incidence angle = 35° | 7.30 | 9.09 | 26.3 | 7.52 | 8.77 | 23.3 | ↑ |
| Measured value Incidence angle = 90° | 6.90 | 8.06 | 22.7 | 6.90 | 8.13 | 23.8 | ↑ |

Then, 1.5 μm-dia. alumina beads were dispersed onto the alignment film of one substrate and the other substrate was applied thereto so that their rubbing directions were parallel and in the same direction to form a blank cell.

The blank cell was filled with a ferroelectric smectic liquid crystal ("CS-1014" (trade name), available from Chisso K. K.) under vacuum and, after sealing, was gradually cooled from isotropic phase at a rate of 0.5° C./hour to 30° C., whereby an alignment was effected. The "CS-1014" liquid crystal in the cell showed the following phase transition series.

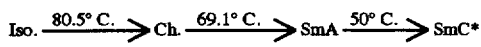

Iso.: isotropic phase,
Ch.: cholesteric phase,
SmA: smectic A phase,
SmC*: chiral smectic C phase.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=15 degrees, transmittance in the brightest state=32%, transmittance in the darkest state=1%, contrast ratio=32:1.

Thus, the device showed a very high contrast. Then, the device was subjected to a continual multiplexing drive, whereby no cell thickness change due to liquid crystal movement was observed at all and a homogeneous high contrast display was retained.

COMPARATIVE EXAMPLE

A liquid crystal cell was prepared in the same manner as in Example 29 except that the polyamic acid was dissolved in a solvent mixture of N-methylpyrrolidone/n-butyl cellosolve=1/0/1.0 (wt. ratio) which had been found to be optimum for providing an ordinary flat alignment film.

During the course of the cell preparation, the carbon atomic ratios of the alignment film before and after the rubbing were measured by XPS. The results are shown in the following Table 4. An shown, the carbon atomic ratios were substantially equal to or even lower than the theoretical value derived from the chemical structure. Further, the alignment film showed a substantially flat surface as a result of SEM observation.

TABLE 4

|  | Before rubbing | | | After rubbing | | |  |
|---|---|---|---|---|---|---|---|
|  | C/F | C/O | C/N | C/F | C/O | C/N |  |
| Theoretical value | 6.67 | 6.67 | 20.0 | 6.67 | 6.67 | 20.0 |  |
| Measured value Incidence angle = 15° | 4.76 | 7.75 | 29.4 | 5.62 | 7.19 | 19.6 | To the surface |
| Measured value Incidence angle = 35° | 5.68 | 7.04 | 20.4 | 5.85 | 6.80 | 20.0 | ↑ |
| Measured value Incidence angle = 90° | 5.75 | 6.90 | 20.8 | 5.99 | 6.80 | 21.7 | ↑ |

As a result of continual multiplexing drive, the liquid crystal device thus obtained showed a high contrast at the same level as Example 29 in the initial stage but, on continuation of the drive, began to cause a recognizable cell thickness change due to liquid crystal movement from after about 100 hours. As a result, a yellowish region was observed on one side of the device (panel) and, on the other side, an alignment disorder occurred due to insufficient amount of liquid crystal, thus lacking uniform display characteristic and reliability.

EXAMPLE 30

Two 1.1 mm-thick glass plates each provided with 1000 Å-thick ITO electrodes were coated with a 6.0 wt. % insulating film-forming solution (of Ti/Si=1/1) containing silica fine particles with an average diameter of 500 Å dispersed in advance therein by printing using an extender plate with a roughness of 16 μm, followed by prebaking at 100° C. for about 10 min., irradiation with ultraviolet rays and baking at 300° C. for 1 hour, to form a 900 Å-thick insulating film.

Then, the insulating film on each substrate was coated with a 2.0 wt. % solution of a polyamide represented by the following structural formula 30-1 in a solvent mixture of N-methyl-pyrrolidone/n-butyl cellosolve (=2/1) by spin coating, followed by baking at 220° C. for about 1 hour to form a 250 Å-thick film, which was then rubbed in one direction with a nylon-planted cloth.

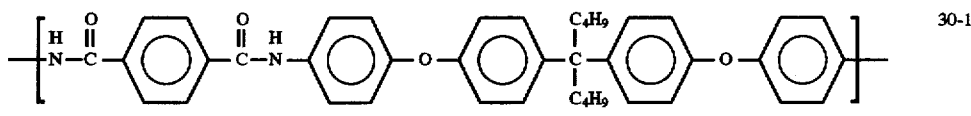

Onto one of the substrates thus treated, alumina beads of about 1.5 μm in average diameter were dispersed, and the other substrate was applied thereto so that their rubbing directions were parallel and in the same direction, to form a blank cell.

The blank cell was then filled with the same ferroelectric smectic liquid crystal ("CS-1014") used in Example 29 in isotropic phase under vacuum and, after sealing, was gradually cooled from isotropic phase at a rate of 0.5° C./min. to about 30° C., whereby an alignment was effected.

The above-prepared liquid crystal cell was sandwiched between a pair of 90 degrees-cross nicol polarizers to provide a liquid crystal device and was supplied with a pulse of 50 μsec and 30 V. Then, the cross nicol polarizers were set at the extinction position (providing the darkest state), and the transmittance through the liquid crystal device at this time was measured by a photo-multiplier. Then, a pulse of 50 μsec and −30 V was applied to the device, and the transmittance (brightest state) at this time was measured in the same manner, whereby the following data were obtained.

Tilt angle θ=15 degrees, transmittance in the brightest state=32%, transmittance in the darkest state=1.3%, contrast ratio=25:1. The delay in optical response causing after-image was 0.3 sec or less.

The liquid crystal device was subjected to multiplexing drive for display using driving waveforms shown in FIG. 33, whereby a high-quality display with a high contrast was attained. Further, after an image display of a prescribed character image, the whole picture area was erased into "white", whereby no after-image was recognized. Referring to FIG. 33, at $S_N$, $S_{N+1}$ and $S_{N+2}$ are shown voltage waveforms applied to scanning lines, at I is shown a voltage waveform applied to a representative date line, and at $(I-S_N)$ is shown a combined voltage waveform applied to the data line I and the scanning line $S_N$. In the above embodiment, the drive was performed under the conditions of $V_0$=5–8 volts and ΔT=20–70 μsec.

EXAMPLE 31

A liquid crystal cell was prepared in the same manner as in Example 30 except that a 200 Å-thick insulating film was formed by applying a 6.0 wt. % insulating film-forming solution (of Ti/Si=1/1) containing silica fine particles with an average diameter of 150 Å dispersed in advance therein by printing using an extender plate of 5 μm, and an alignment film of a polyimide represented by the following formula 31—1 was formed through baking at 270° C.

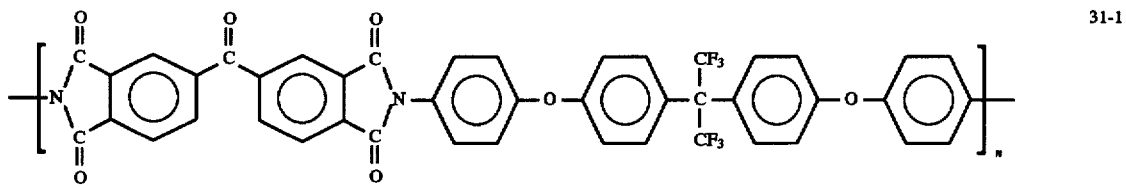

The liquid crystal cell was subjected to the same test as in Example 30, whereby results including a contrast ratio of 23:1 and a delay in optical response of 0.2 sec were obtained.

As a result of the same multiplexing display drive test as in Example 30, similarly good results were obtained with respect to contrast and after-image.

EXAMPLE 32

A liquid crystal cell was prepared in the same manner as in Example 30 except that a 200 Å-thick insulating film was formed by applying a 6.0 wt. % insulating film-forming solution (of Ti/Si=1/1) containing silica fine particles with an average diameter of 150 Å dispersed in advance therein by printing using an extender plate of 5 μm.

The liquid crystal cell was subjected to the same test as in Example 30, whereby results including a contrast ratio of 24:1 and a delay in optical response of 0.3 sec were obtained.

As a result of the same multiplexing display drive test as in Example 30, similarly good results were obtained with respect to contrast and afterimage.

COMPARATIVE EXAMPLE (1) For comparison with Examples 30–32, a liquid crystal cell was prepared in the same manner as in Example 30 except that the insulating film was formed without inclusion of the fine particles.

The liquid crystal cell was subjected to the same test as in Example 30, whereby results including a contrast ratio of 14:1 and a delay in optical response to 2.1 sec were obtained. As a result of the same multiplexing display drive test as in Example 30, the contrast was lower than those in Examples 30–32, and, after-image was recognized.

(2) For further, comparison, a liquid crystal cell was prepared in the same manner as in Example 31 except that a 900 Å-thick insulating film was formed by using an extender plate of 16 Åm.

The liquid crystal cell was subjected to the same test as in Example 30, whereby results including a contrast ratio of 12:1 and a delay in optical response of 2.5 sec were obtained. As a result of the same multiplexing display drive test as in Example 30, the contrast was lower than those in Examples 30–32, and, after-image was recognized.

EXAMPLE 33

A glass substrate was provided with 1500 Å-thick ITO transparent electrodes which showed an uneven surface providing an average difference in height of 150 Å and an average pitch of unevenness of 200 Å as a result of STM observation. The glass substrate was then coated with a 0.4 wt. % organic alignment control film forming solution obtained by diluting an aligning agent ("Semicofine Lp 64", mfd. by Toray K. K.) with a solvent mixture of N-methylpyrrolidone/n-butyl cellosolve (=2/1) by spin coating at 2700 rpm for 20 sec., to form an alignment film having a thickness of 30 Å (as measured by "Elipso meter"). The alignment film was rubbed with a nylon cloth under the conditions of a pressing margin of 0.4 mm, a rotation speed of 1000 rpm and a substrate moving speed of 12 mm/sec to provide a uniaxial alignment axis.

Two substrates thus treated were then applied to each other with 1.5 µm dia. spacer beads dispersed therebetween, to form a blank cell. The blank cell was filled under vacuum with FLC1 having the following properties heated into liquid by capillary action, to form a liquid crystal cell. Properties of FLC1 (at 25° C.)

Ⓗ=27 degrees, Ps=90 nC/cm$^2$,

Phase transition series (° C.)

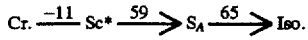

Figure 34A:
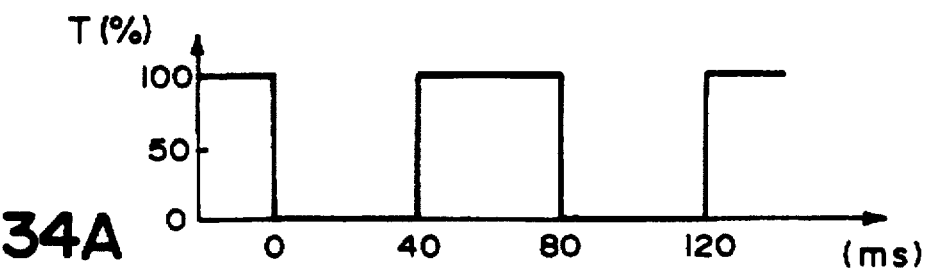
FIGS. 34A–34C are transmission characteristic views for illustrating switching memory characteristics according to Example 33 and a Comparative Example.

The liquid crystal cell was then gradually cooled from 80° C. to 25° C. under application of rectangular wave voltages of ±10 volts and 10 Hz, whereby a homogenous finger alignment was developed, showing an apparent tilt angle of 25.5 degrees. Then, bipolar pulse voltages of ±10 volts and ΔT=40 µsec were applied to the cell in this state, whereby a good switching and memory characteristic was obtained as shown in FIG. 34A in terms of transmittance characteristic.

The homogeneous alignment state obtained in the above liquid crystal cell is shown in FIG. 24 (a polarizing microscopic photograph) in comparison with FIG. 23 showing a disordered alignment obtain in a liquid crystal cell prepared by using 200 Å-thick ITO electrodes with a smaller degree of unevenness as will be described hereinafter.

EXAMPLE 34

Into a 1.5 wt. % solution of acetyl-acetonatorin (II) in butanol, silica beads with an average diameter of 500 Å were dispersed at rate of 0.1 wt. % and subjected to ultrasonic dispersion. The resultant dispersion was applied onto a glass substrate provided with 700 Å-ITO electrodes by spin coating at 3000 rpm for 30 sec., followed by baking at 30° C. for 1 hour to form a 300 Å-thick tin oxide film. The film showed a surface unevenness providing an average difference in height of 200 Å and an average unevenness pitch of 1000 Å.

For reference, an aluminum was deposited to form an electrode of 1 cm$^2$ in vacuum on the above tin oxide film (but separately formed) to measure the resistance by an impedance analyzer ("4192A LF", available from Yokogawa Hewllet-Packard K. K.), whereby a value of 8 ohm. was obtained at 20 kHz.

Then, the tin oxide film was coated with a 1.0 wt. % organic alignment control film forming solution obtained by diluting an aligning agent ("Semicofine Lp 64", mfd. by Toray K. K.) with a solvent mixture of N-methylpyrrolidone/n-butyl cellosolve (=2/1) by spin coating at 2700 rpm for 20 sec., to form an alignment film having a thickness of 90 Å. The alignment film was rubbed with a nylon cloth under the conditions of a pressing margin of 0.4 mm, a rotation speed of 1000 rpm and a substrate moving speed of 12 mm/sec to provide a uniaxial alignment axis.

Figure 34B:
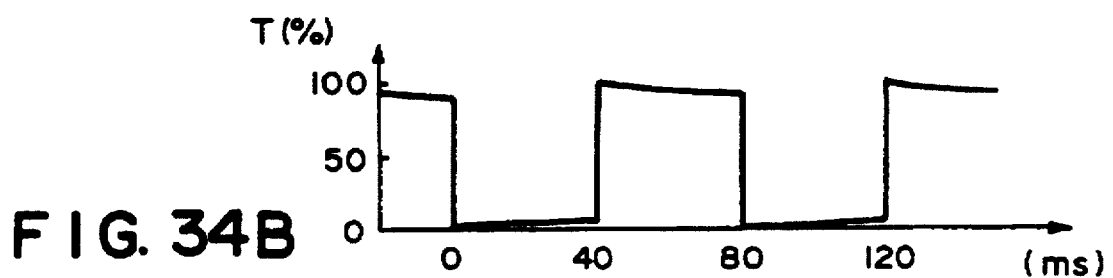

Two substrates thus treated were then applied to each other with 1.5 µm dia. spacer beads dispersed therebetween, to form a blank cell. The blank cell was filled with the same FLC1 as used in Example 33 and cooled under AC application in the same manner as in Example 33, whereby a homogenous finger alignment was developed. Then, bipolar pulse voltages of ±10 volts and ΔT=40 µsec were applied to the cell in this state, whereby a good switching and memory characteristic was obtained as shown in FIG. 34B in terms of transmittance characteristic.

EXAMPLE 35

A glass substrate provided with 1500 Å-thick ITO transparent electrodes identical to the one used in Example 33 was coated with a 0.4 wt. % organic alignment control film forming solution obtained by diluting an aligning agent ("Sunever SE100", mfd. by Nissan Kagaku K. K.) with a solvent mixture of N-methylpyrrolidone/n-butyl cellosolve (=1/1) by spin coating at 2700 rpm for 20 sec., to form an alignment film having a thickness of 30 Å. The alignment film was rubbed with a nylon cloth under the conditions of a pressing margin of 0.4 mm, a rotation speed of 1000 rpm and a substrate moving speed of 12 mm/sec to provide a uniaxial alignment axis.

Two substrates thus treated were then applied to each other with 1.5 µm dia. spacer beads dispersed therebetween, to form a blank cell. The blank cell was filled under vacuum with FLC2 having the following properties heated into liquid by capillary action, to form a liquid crystal cell. Properties of FLC2 (at 25° C.).

Ⓗ=23 degrees, Ps=28 nC/cm$^2$,

Phase transition series (° C.)

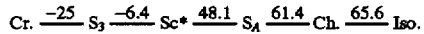

The liquid crystal cell was then gradually cooled from the liquid phase to Sc* phase (25° C.) under application of rectangular wave voltages of ±25 volts and 10 Hz, whereby a homogenous fringe alignment was developed. The cell thus obtained also showed a good switching memory characteristic.

COMPARATIVE EXAMPLE (i)

Figure 34C:
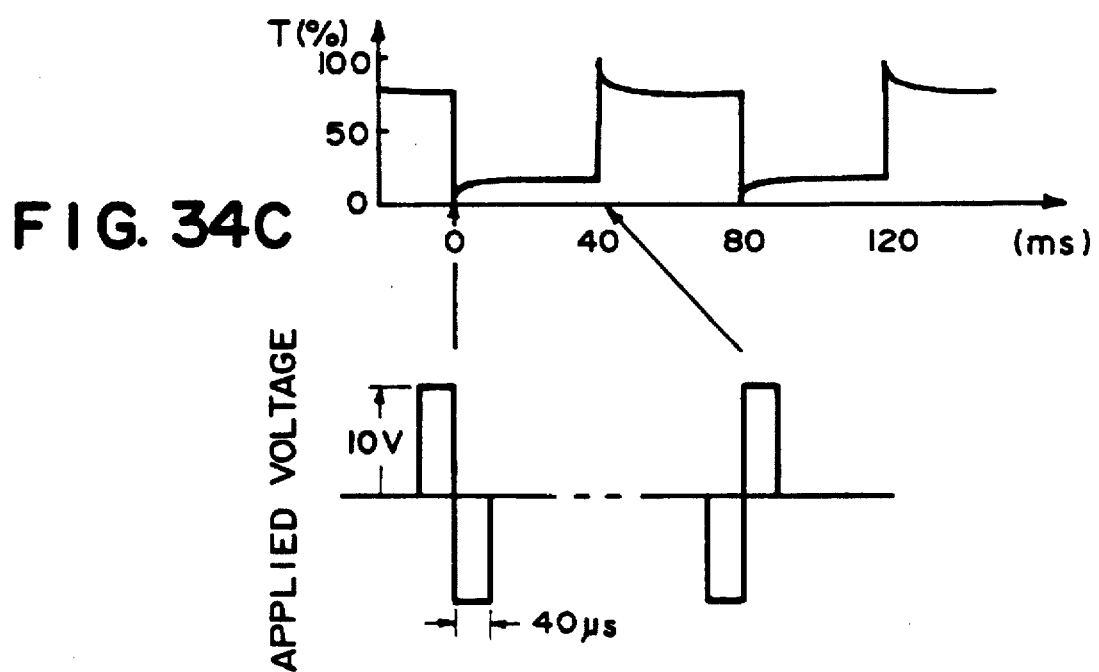

A liquid crystal cell was prepared in the same manner as in Example 33 except that a 150 Å-thick alignment film was formed by applying the alignment film-forming solution but having a concentration of 1.0 wt. by spin coating at 2000 rpm for 20 sec. The liquid crystal cell provided a homogeneous fringe alignment but showed a poor switching memory characteristic as shown in FIG. 34C, thus failing to show 100% switching-memory characteristic.

COMPARATIVE EXAMPLE (ii)

A liquid crystal cell was prepared in the same manner except that glass substrates provided with 200 Å-thick ITO electrodes. The liquid crystal cell showed a generally fringe alignment but the inclination thereof varied place to place, thus showing a disorder in axial alignment characteristic (FIG. 23). In this state, good switching-memory characteristic could not be obtained.

As described above, through improvement in physical and chemical surface states of the alignment films, the liquid crystal device according to the present invention can provide a display characteristic with good contrast and suppress the phenomenon of liquid crystal molecular movement occurring in a long term drive, thus being able to retain good and uniform display characteristics for a long term.

Further, by using an alignment control layer having specific sizes of concavities (dimples) or convexities (dots) at a specific density, it is possible to provide a ferroelectric liquid crystal device which can effectively suppress liquid crystal molecular movement liable to cause a thickness change along a cell side during long term drive of a ferroelectric liquid crystal and thus show stable driving characteristics.

Further, according to the present invention, it is possible to suppress liquid crystal molecular movement during drive by forming an unevenness at the surface of the insulating film, thus remarkably decreasing color change due to an increase in cell thickness along a cell side and retaining a stable alignment state within a long term drive.

Moreover, according to the present invention, it is possible to reduce the liquid crystal movement within a cell and improve the display quality by incorporating fine particles within or at the surface of the insulating film.

Further, according to the present invention, prescribed dimples or spherical fine particles are disposed at the surface of an insulating film, whereby the liquid crystal movement was reduced and the cell thickness increase at a cell side is reduced to prevent yellowing, while retaining a good alignment characteristic.

Further, in the present invention, an unevenness is provided at the surface of an insulating film disposed below the alignment control film, so that the liquid crystal movement can be suppressed while retaining a good alignment characteristic without a substantial adverse effect to the alignment of the liquid crystal.

Further, in the present invention, inorganic fine particles may be dispersed on a first insulating layer and then a second insulating layer may be formed by vacuum deposition, so that a shadowing effect of the inorganic fine particles can be effectively utilized for dimple formation. Thus, it is possible to optimize the effect of suppressing the yellowing and occurrence of void due to reduction in liquid crystal movement.

Further, according to the present invention, the liquid crystal movement is suppressed and the cell thickness fluctuation is less liable, so that yellowing along a cell side can be prevented and a high-quality image display apparatus or recording apparatus can be provided.

Further, according to the present invention, it is possible to realize a stable C1 uniform alignment, thus being able to realize an image display which shows a higher luminance and a higher contrast than those obtained by utilizing bistable states in a conventional C2 alignment.

Further, according to the present invention, it is possible to obtain a liquid crystal display device capable of suppressing liquid crystal movement while retaining a homogenous alignment characteristic, which includes a ferroelectric liquid crystal disposed between a pair of substrates each having an electrode and a polyimide alignment film, by applying onto a substrate provided with an electrode an alignment film-forming solution containing 20–60 wt. % of n-butyl carbitol and 2–6 wt. % of polyimide or its precursor, leaving the coating solution on the substrate standing for at least 30 min. in an environment of a temperature of 18°–27° C. and a humidity of 35–60%RH, and then heating the coating to form a 150–400 Å-thick polyimide alignment film.

Further, according to the present invention, it is possible to adopt a sequence of applying an alignment film-forming solution containing fine particles having a size equal or smaller than the cell gap onto a substrate already provided with electrodes, heating the applied solution to form an alignment film and removing the particles to form an unevenness at the surface of the alignment film effective for reducing the liquid crystal movement. As a result, such an unevenness can be stably and reliably formed by controlling the size and amount of the fine particles to be incorporated. Accordingly, the liquid crystal movement can be reliably controlled.

Further, according to the present invention, it is possible to provide a ferroelectric liquid crystal device showing a homogeneously alignment and a good switching and memory characteristic by forming an alignment film in a thickness of at most a prescribed value on an uneven surface having an optimized unevenness.

Further, according to the present invention, the latitude of selection of alignment film material is enlarged, so that a material, such as polyamide, not requiring a higher temperature treatment can also be used and the productivity can be improved. Further, the resultant liquid crystal device provides a high quality display as represented by a high contrast between bright and dark states, particularly a very high contrast during a multiplexing drive, and freeness from ugly after-image or persistence.

Incidentally, the particles to be mixed within an alignment film-forming solution or incorporated within or disposed at the surface of an insulating film need not be silica beads but can comprise particles of any materials which are resistant to the baking temperature, e.g., 300° C.

Further, the various embodiments of the present invention set forth above can be provided or combined with each other within the gist of the present invention.

What is claimed is:

1. A ferroelectric liquid crystal device, comprising: a pair of substrates each successively having thereon an electrode layer for voltage application, an insulating layer and an alignment film layer, and a ferroelectric liquid crystal disposed between the substrates, wherein said insulating layer has a face closer to the liquid crystal which has been subjected to rubbing.

2. A device according to claim 1, wherein said side of the insulating layer has been rubbed with glass wool or steel wool.

3. A device according to claim 1, wherein said side of the insulating layer has been rubbed with a rubbing cloth comprising yarn of nylon, acetate or polyester.

4. A ferroelectric liquid crystal device comprising: a ferroelectric liquid crystal, and a pair of substrates disposed opposite to each other so as to sandwich the ferroelectric liquid crystal and each having on its opposite surface a transparent electrode for applying voltages to the ferroelectric liquid crystal and an alignment film subjected to a uniaxial aligning treatment for aligning the ferroelectric liquid crystal, wherein said alignment film has a thickness d of at most 100 Å and is formed on an uneven surface having a surface unevenness providing a difference in height of at most 500 Å and an average pitch of unevenness of at most 1000 Å, wherein said uneven surface is provided by a low-resistivity short circuit-preventing layer.

5. A device according to claim 4, wherein said low-resistivity short circuit-preventing layer is provided with the surface unevenness by fine particles.

6. A ferroelectric liquid crystal device comprising: a ferroelectric liquid crystal, and a pair of substrates disposed opposite to each other so as to sandwich the ferroelectric liquid crystal and each having on its opposite surface a transparent electrode for applying voltages to the ferroelectric liquid crystal and an alignment film subjected to a uniaxial aligning treatment for aligning the ferroelectric liquid crystal, wherein said alignment film has a thickness d of at most 100 Å and is formed on an uneven surface having a surface unevenness providing a difference in height of at most 500 Å and an average pitch of unevenness of at most 1000 Å, wherein said surface unevenness provides an average difference in height of 100–500 Å.

7. A device according to claim 6, wherein said uneven surface is provided by the transparent electrode and the difference in height is provided by controlling the thickness of the transparent electrode.

8. A device according to claim 6, wherein said ferroelectric liquid crystal is placed in an alignment state showing an increased apparent tilt angle θa formed by application of an AC electric field.

9. A device according to claim 6, wherein said surface unevenness provides an average pitch of unevenness of 100–1000 Å.

10. A ferroelectric liquid crystal device comprising: a ferroelectric liquid crystal, and a pair of substrates disposed opposite to each other so as to sandwich the ferroelectric liquid crystal and each having on its opposite surface a transparent electrode for applying voltages to the ferroelectric liquid crystal and an alignment film subjected to a uniaxial aligning treatment for aligning the ferroelectric liquid crystal, wherein said ferroelectric liquid crystal is placed in an alignment state showing an increased effective tilt angle formed by application of an AC electric field, and said alignment film is formed on an uneven surface having a surface unevenness providing a difference in height of at most 500 Å and an average pitch of unevenness of at most 1000 Å, said surface unevenness providing an average difference in height of 100–500 Å.

11. A device according to claim 10, wherein said surface unevenness provides an average pitch of unevenness of 100–1000 Å.

* * * * *